(12) United States Patent
Anderson et al.

(10) Patent No.: US 7,899,324 B2
(45) Date of Patent: Mar. 1, 2011

(54) METHOD AND APPARATUS FOR SAMPLED OPTICAL SIGNAL MONITORING

(75) Inventors: Trevor Anderson, Northcote (AU); Sarah Dods, Box Hill North (AU); Adam Kowalczyk, Glen Waverly (AU); Justin Bedo, Australian Capital Territory (AU); Kenneth Paul Clarke, Glen Iris (AU)

(73) Assignee: Nicta IPR Pty Limited, Eveleigh, New South Wales (AU)

( * ) Notice: Subject to any disclaimer, the term of this patent is extended or adjusted under 35 U.S.C. 154(b) by 0 days.

(21) Appl. No.: 12/089,360

(22) PCT Filed: Oct. 13, 2006

(86) PCT No.: PCT/AU2006/001523
§ 371 (c)(1),
(2), (4) Date: Sep. 19, 2008

(87) PCT Pub. No.: WO2007/041808
PCT Pub. Date: Apr. 19, 2007

(65) Prior Publication Data
US 2009/0028554 A1    Jan. 29, 2009

(30) Foreign Application Priority Data

Oct. 13, 2005 (AU) .................................. 2005905668
Mar. 3, 2006 (AU) .................................. 2006901088
Oct. 5, 2006 (AU) .................................. 2006905508

(51) Int. Cl.
*H04B 10/08* (2006.01)
*H04B 17/00* (2006.01)

(52) U.S. Cl. ............... 398/25; 398/26; 398/27; 398/28; 398/29; 398/33; 398/177

(58) Field of Classification Search ............ 398/25–35
See application file for complete search history.

(56) References Cited

U.S. PATENT DOCUMENTS

| 5,438,199 | A  | * | 8/1995  | Agam et al. ................ 250/334 |
| 7,127,181 | B2 | * | 10/2006 | Gnauck et al. .............. 398/159 |
| 7,236,238 | B1 | * | 6/2007  | Durresi et al. ............. 356/73.1 |
| 7,283,744 | B2 | * | 10/2007 | Dinu et al. ................... 398/33 |
| 2004/0002313 | A1 | * | 1/2004 | Peace et al. ............... 455/234.1 |
| 2004/0175176 | A1 |   | 9/2004 | Lo |
| 2007/0038737 | A1 | * | 2/2007 | Keller et al. ................ 709/224 |

FOREIGN PATENT DOCUMENTS

| WO | WO 92/11709  | 7/1992  |
| WO | WO 03/098844 | 11/2003 |

OTHER PUBLICATIONS

Andre: "Asynchronous Sampled Amplitude Histogram Model for Optical Performance Monitoring in High Speed Networks", LEOS 2003, Oct. 27-28, 2003, pp. 911-912.*

* cited by examiner

*Primary Examiner* — Li Liu

(57) ABSTRACT

Monitoring an optical signal comprises sampling the optical signal from two or more distinct tap points to retrieve a sample set. Multiple such sample sets are obtained over time. A joint probability distribution or phase portrait of the sample sets is assessed for indications of optical signal quality. The tap distinction can be polarization, for example to determine OSNR, or frequency. The tap distinction can be a time delay, which can enable diagnostic differentiation between multiple impairments, such as OSNR, dispersion, PMD, jitter, Q, and the like. Machine learning algorithms are particularly suitable for such diagnosis, particularly when provided a two dimensional histogram of sample density in the phase portrait.

11 Claims, 37 Drawing Sheets

Standard eyes (top) and phase portraits (below) for (a) NRZ, (b) RZ, (c) NRZ DPSK. Inset shows 70GHz optical bandwidth results for RZ and NRZ with no chromatic dispersion for comparison Comparison of dispersion measurement for NRZ using a 70GHz demux filter and 10GHz fabry-perot filter Conventional 1-bit delay interferometer
NRZ-DPSK eyes (top) and phase portraits (lower).

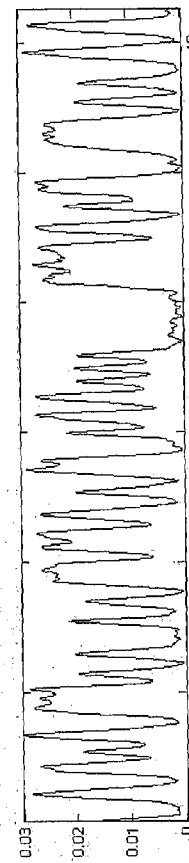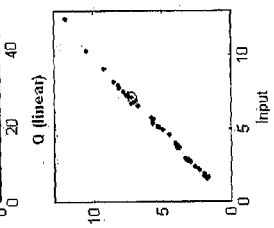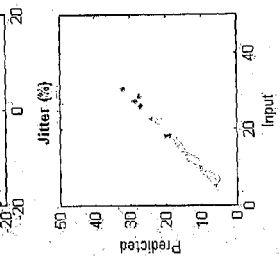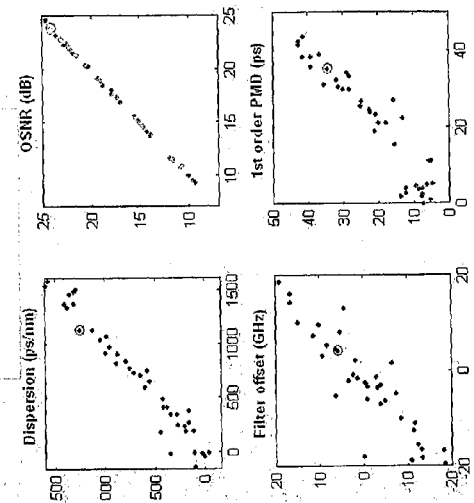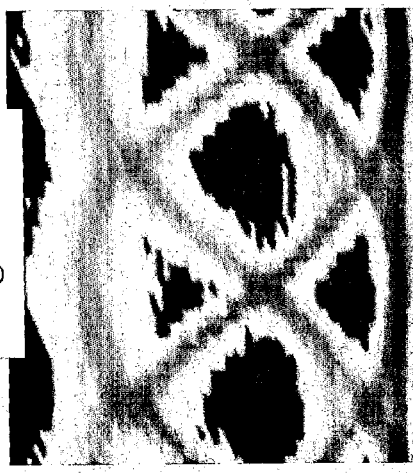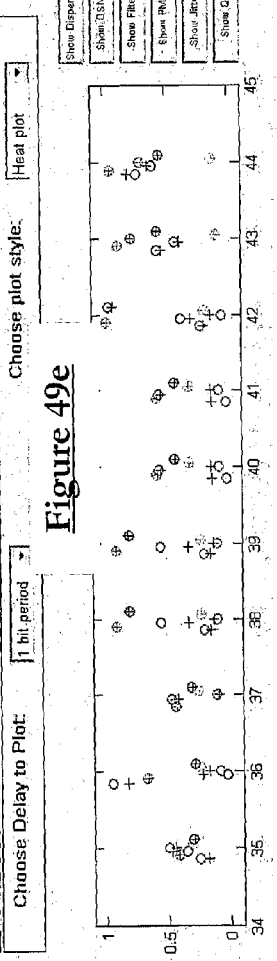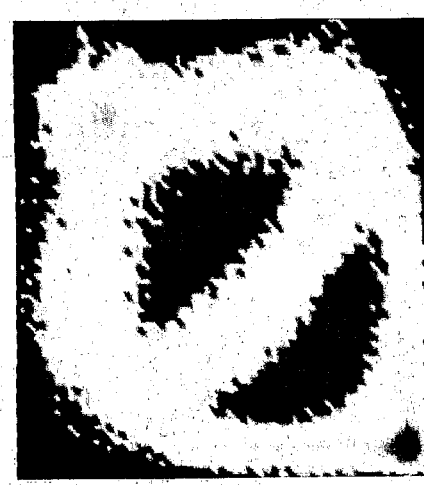
Figure 49a
Figure 49b
Figure 49c
Figure 49d
Figure 49e

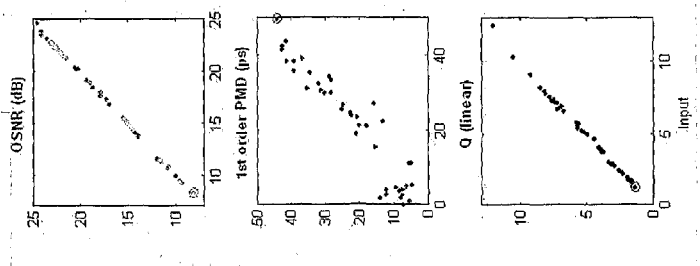
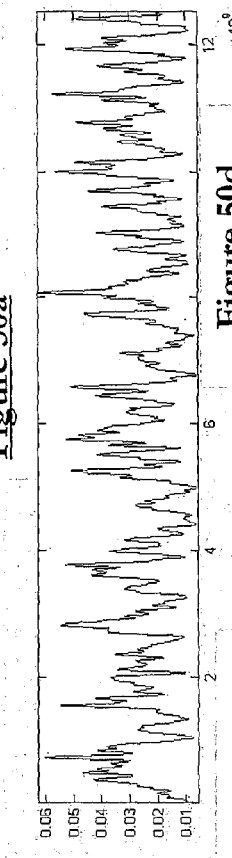
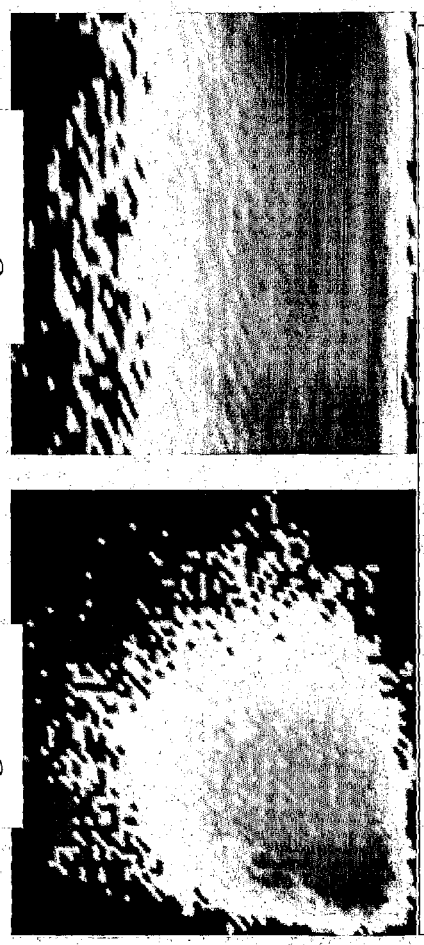
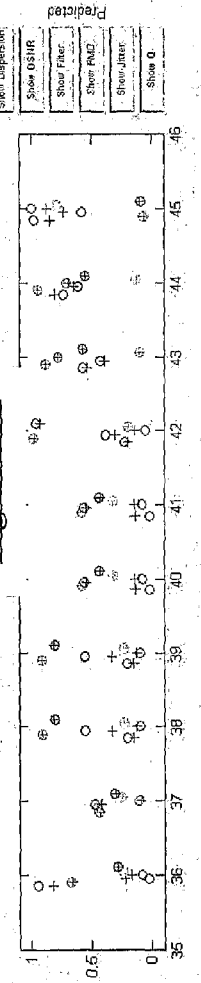
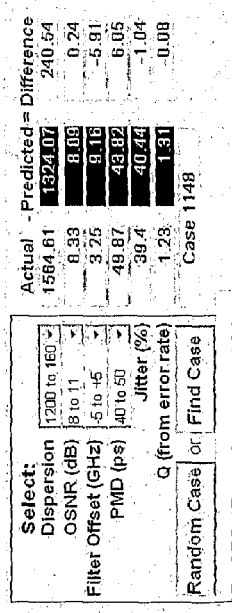
Figure 50a
Figure 50b
Figure 50c
Figure 50d
Figure 50e

METHOD AND APPARATUS FOR SAMPLED OPTICAL SIGNAL MONITORING

CROSS-REFERENCE TO RELATED APPLICATIONS

The present application claims priority from Australian Provisional Patent Application No 2005905668 filed on 13 Oct. 2005, Australian Provisional Patent Application No 2006901088 filed on 3 Mar. 2006, and an Australian Provisional Patent Application filed on 5 Oct. 2006, the contents of which are incorporated herein by reference.

TECHNICAL FIELD

The present invention relates to optical performance monitoring, and in particular relates to a sampling technique for retrieving optical signal quality information.

BACKGROUND OF THE INVENTION

Optical performance monitoring is becoming increasingly important, particularly in dense wavelength division multiplexed (DWDM) optical communication systems. The main drivers for signal monitoring are to identify changes in transmitted signals, to diagnose the cause and location of the underlying faults, to optimize the performance of tunable elements, and to estimate the bit-error rate (BER).

Currently, there are two classes of optical signal monitors, namely frequency domain monitors and time domain monitors. Frequency domain methods analyse the spectral content of the signal. These methods average the signal over time and therefore contain little or no information about signal distortion. The optical spectrum analyser is an example of a device for frequency domain monitoring.

Time domain signal monitoring techniques sample the waveform, whether asynchronously or synchronously. Such time domain techniques are sensitive to signal distortion and noise.

Synchronous time domain techniques require a clock to be extracted from the signal so that the sampling can be synchronized to the signal bit rate. Such techniques include sampling oscilloscopes which produce eye diagrams (being a plot of sample amplitude vs. time), and Q-factor monitors. The synchronous waveform monitor (also known as a digital sampling oscilloscope, whether real time or interleaved) is a test and measurement device which measures the eye pattern of the optical waveform. However, the synchronous technique relies on access to the signal clock to align sampling times with the bit sequence. In the laboratory setting the clock is readily available as one has access to the data source. In the field the clock has to be recovered from the data, using a clock extraction circuit. Not only does clock extraction involve added expense, a typical clock extraction circuit only works over a limited range of bit rates and formats. Another type of synchronous sampling technique is described in U.S. Pat. No. 6,904,237, in which a histogram of sample density against sample amplitude is produced.

In contrast, asynchronous sampling techniques such as asynchronous histograms do not require clock extraction circuitry and are therefore cheaper to implement and are transparent to bit rate. An asynchronous time domain sampling technique is described in U.S. Pat. No. 6,836,620, in which a histogram of sample density against sample amplitude is produced.

The shape of such asynchronous and synchronous histograms changes as the signal becomes degraded, and significant effort has been put into correlating these changes with various degradation mechanisms. However, differentiating between degradation mechanisms is difficult, particularly when they occur simultaneously, because different degradation mechanisms can cause similar changes in histogram shape.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY OF THE INVENTION

According to a first aspect the present invention provides a method of monitoring an optical signal, the method comprising:

sampling the optical signal from at least two tap points to retrieve a sample set, the at least two tap points adapted to retrieve distinct samples from the optical signal;
retrieving a plurality of such sample sets over time; and
assessing a distribution of the sample sets for indications of optical signal quality.

According to a second aspect the present invention provides an optical signal monitor comprising:

a multi-tap sampler for sampling from the optical signal a sample set from at least two tap points adapted to retrieve distinct samples from the optical signal, and for retrieving a plurality of such sample sets over time; and
a processor for building a representation of a distribution of the sample sets.

In some embodiments, the at least two tap points may be adapted to retrieve samples from distinct optical spectral positions. For example the optical signal may be split into two components, with a first component being passed through a first optical filter having a first passband, and a second component being passed through a second optical filter having a second passband distinct from the first passband. For example the first passband may be substantially centred upon a lower band edge of the optical signal, while the second passband may be substantially centred upon an upper band edge of the optical signal.

Additionally or alternatively, in further embodiments of the invention the at least two tap points may be adapted to retrieve samples from distinct polarisation components of the optical signal. For example the optical signal may be split into two components, with a first component being passed through a first optical polariser having a first polarisation alignment, and a second component being passed through a second optical polariser having a second polarisation alignment distinct from the first polarisation alignment. For example the first polarisation alignment and the second polarisation alignment may differ by substantially 45 degrees, or by substantially 90 degrees. Additionally or alternatively, the optical signal may be split into two components by a polarisation beam splitter. Preferably, samples of the two components are formed into a joint probability distribution or scatter plot. For an ASK modulated optical signal a major axis of the joint probability distribution plot is preferably determined, and an OSNR measurement may be directly obtained from a width or standard deviation of a minor axis. For a PSK modulated optical signal an OSNR measurement is preferably derived from both a standard deviation of the major axis and a standard deviation of the minor axis.

In still further embodiments of the invention the at least two tap points may additionally or alternatively be adapted to retrieve samples from distinct electrical spectral positions. For example the optical signal may be detected by an electrical receiver, and an output of the electrical receiver may be passed to a first electrical filter having a first passband and to a second electrical filter having a second passband distinct from the first passband. The first passband may be centred upon a frequency corresponding to the data rate, such that a data series of alternating ones and zeros may be detected by a first tap point taking samples from the first electrical filter output. The second passband may be centred upon low frequencies, such that a data series of consecutive ones or consecutive zeros may be detected by a second tap point taking samples from the second electrical filter output. In another example the electrical filters may have the same centre frequency but different bandwidths.

Assessing the distribution of the sample sets for indications of optical signal quality may comprise plotting the sample sets as a two dimensional, three dimensional or greater dimensional "scatter plot" or "phase portrait" and visually assessing the characteristics of the scatter plot. Additionally or alternatively, the sample sets may be built into a joint probability density function or histogram.

In some embodiments of the invention optical sampling may be provided. For example, optical sampling pulses may be optically mixed with components of the optical signal obtained at each of a plurality of optical tap points. The optical mixing may be performed by an optical AND gate.

In preferred embodiments of the invention, the assessment of the distribution of the sample sets may involve use of a machine learning algorithm. Such embodiments are particularly advantageous in efficiently processing large numbers of sample sets which may be obtained. The machine learning module may rely on supervised learning techniques for either classification or regression, such as k-nearest neighbours, decision trees, regression, ridge regression, neural networks and/or support vector machine/regression. The machine learning module may utilise a linear kernel, or a non-linear kernel, such as a polynomial of degree n. The machine learning module may be trained on training sets created from simulations and/or experimental measurements. Preferably, the machine learning assessment of the distribution of the sample set comprises assessing sample density throughout the scatter plot, for example by considering the scatter plot area as a plurality of sub-areas and determining a number of sample points occurring in each sub-area so as to generate a multi dimensional histogram of sample density. The sub-areas are preferably evenly sized elements of a grid. Or, the sub-areas may be of differing sizes, for example a maximum bin size may capture all points above a maximum threshold, while a minimum bin size may capture all points below a minimum threshold. The grid element size may be refined to improve prediction accuracy. The grid element size may be increased in order to decrease processing requirements. For example a single decision threshold (1 bit resolution) could be used on each tap. Such embodiments recognise that it is advantageous to include sample density as a factor in the machine learning assessment.

The at least two tap points may additionally or alternatively be adapted to retrieve samples from the optical signal which are separated in time. Thus, according to a third aspect the present invention provides a method of monitoring an optical signal, the method comprising:
sampling the optical signal from at least two tap points to retrieve a sample set, the at least two tap points adapted to retrieve samples from the optical signal which are separated in time by a tap delay;
retrieving a plurality of sample sets over time; and
building a joint probability density function of the sample sets.

According to a fourth aspect the present invention provides an optical signal monitor comprising:
a multi-tap sampler for sampling from the optical signal a sample set from at least two tap points adapted to retrieve samples from the optical signal which are separated in time by a tap delay, and for retrieving a plurality of such sample sets over time; and
a processor for building a joint probability density function of the sample sets.

Building a probability density function in accordance with the present invention can provide a valuable monitoring tool. For example, when each sample set comprises two samples $x_1$ and $x_2$ obtained from two tap points separated by a tap delay, a two dimensional plot of the probability density function of $x_1$ vs. $x_2$ takes a form which depends upon both the tap delay between the two sampling points, and upon characteristics of the optical signal. Thus, degradation in the optical signal leads to changes in the probability density function which can in turn be identified, measured, and/or characterised. It has further been realised that different degradation types can influence the probability density function in different ways, such that identifying a particular effect upon the probability density function can enable identification of a corresponding degradation type causing that effect, potentially enabling more accurate diagnostic differentiation between degradation mechanisms affecting the optical signal being monitored.

The present invention thus provides for a sampling technique, whether synchronous or asynchronous, which enables a representation of the signal to be produced which is an alternative to the traditional eye pattern.

The sample sets are preferably retrieved at a regular sampling interval. Alternatively, the sample sets may be retrieved at irregular or random intervals.

In preferred embodiments of the invention, the sampling interval is asynchronous relative to the optical signal being monitored. Such embodiments recognise that asynchronous retrieval of sample sets nevertheless enables a probability density function to be built in accordance with the present invention. Further, asynchronous monitoring is advantageous in eliminating the need for devices to retrieve a clock signal from the monitored signal, as is required in synchronous techniques.

In alternate embodiments of the invention, the sampling interval may be synchronous with the optical signal being monitored, for example by retrieving a sampling interval clock signal from the optical signal being monitored. While involving clock signal retrieval, such synchronous sampling nevertheless enables a probability density function to be built in accordance with the present invention. Further, synchronous sampling may be controlled to retrieve samples from selected portions of the optical signal being monitored, for example, the samples may be retrieved from substantially the centre of each bit period of the optical signal, or may be retrieved from a transition region between the centre of adjacent bit periods.

Preferably, the optical signal being monitored is tapped from an optical communications link such that the monitoring of the present invention can be performed simultaneously with ongoing signal transmission over the link.

The or each tap delay between the at least two sample points may be applied in the electrical domain, for example by buffering, or in the optical domain, for example by splitting the optical signal into paths of different lengths.

The or each tap delay is preferably tuneable. Such embodiments enable tuning of the or each tap delay in order to determine an unknown bit rate of the optical signal being monitored, for example based on knowledge of patterns produced at known ratios of tap delay to bit period. Additionally or alternatively, the or each tap delay may be tuned to a desired ratio of tap delay to bit period, in order to assess a selected degradation type. For example, the or each tap delay may be tuned or set to be substantially equal to the bit period in order to assess dispersion. Additionally or alternatively, the or each tap delay may be tuned or set to be less than substantially half the bit period in order to assess first-order polarisation mode dispersion (PMD). Additionally or alternatively the tap delay may be continuously tuned to give a histogram time series (or time series of histograms).

Preferably, the or each optical receiver used to detect the optical signal has a receiver bandwidth which is greater than or equal to the bandwidth of the optical signal. A high receiver bandwidth is advantageous in that signatures of impairments (such as dispersion) may potentially be more evident in the high frequency components of the waveform.

However, in alternate embodiments, the receiver bandwidth may be less than the signal bandwidth, for example as low as substantially ¼ of the signal bandwidth, or substantially less than ¼ Of the signal bandwidth. While a reduced receiver bandwidth loses high frequency signatures, it has been recognised that there is still significant information in two point asynchronous sampling with such reduced receiver bandwidths. Indeed, reduced receiver bandwidths may assist in separating or filtering out high frequency degradation mechanisms when a lower frequency mechanism is of interest. Such embodiments are further advantageous in avoiding the increased cost of high speed receiver electronics. In an alternative embodiment nonlinear optical elements may precede one or both detectors in order. The nonlinear elements move high frequency degradations to lower frequencies thereby enabling the use of lower speed receivers and electronics Preferably, the sampling interval is substantially greater than the bit period, for example many orders of magnitude greater than the bit period, in order to reduce processing speed demands upon sampled data retrieval devices, and thus reduce the cost of such data retrieval devices. Alternatively the sampling interval may be of the order of the bit period, whether synchronous or asynchronous.

In embodiments consisting of two sample taps which retrieve a sample set consisting of $x_1$ and $x_2$, the probability density function may be displayed in two dimensions, for example by plotting $x_1$ vs. $x_2$, or by plotting $(x_1-x_2)$ vs. $(x_1+x_2)$, or by use of other two dimensional representations. Such embodiments may further comprise displaying sample point density as a third dimension of such plots, where the third dimension may for example be represented by a colour scale, a greyscale, an isometric representation or otherwise.

Such two dimensional or three dimensional plots of the probability density function built in accordance with the present invention may be displayed for human observation and interpretation. The present invention may thus provide a portable monitoring device with electronic display for field use in monitoring and diagnosing an optical signal.

In further embodiments of the invention, three or more sample tap points separated by tap delays may be provided in order to retrieve sample sets consisting of three or more samples. For example, where the tap delay separation of three such tap points is a fraction of a bit period, a probability density function of such sample sets may be used to obtain information about optical signal curvature. The separation between first and second tap may differ from the separation between the second and third tap.

Preferably, a band or channel of interest is selected by use of a band pass filter prior to sampling.

Alternate representations or processing of the probability density function may be exploited to investigate selected characteristics of the optical signal and/or degradation mechanisms acting upon the optical signal.

Further embodiments of the invention may additionally or alternatively apply a decision threshold to each sample such that each sample value output is either 1 or 0. Such embodiments provide a measurement of the probability of detecting binary combinations of sample values. For example where two tap points are used, such embodiments provide a measure of the probability of detecting either (0,0), (0,1), (1,0) or (1,1). The level of the decision threshold may be varied, and/or the tap delay or tap distinction may be varied, in order to give further insight into such probabilities.

Further, where two tap time delay asynchronous sampling is performed, some such embodiments may further provide for generation of an approximation of a synchronous eye diagram, by exploiting the fact that the density of points along each transition path in the asynchronous scatter plot is inversely proportional to the slope of the corresponding transition in a synchronously obtained eye diagram.

According to a fifth aspect the present invention provides an optical communications link incorporating an optical signal monitor in accordance with the second and/or fourth aspect of the invention.

According to a sixth aspect the present invention provides a method of monitoring an optical communications link, the method comprising:
  distributing along the optical communications link a plurality of optical signal monitors in accordance with the second or fourth aspects of the invention.

In preferred embodiments of the sixth aspect of the invention, the output of the monitors distributed along the link are returned to a central monitoring location. The monitors may for example be embedded within reconfigurable optical switches. A monitor may be placed at or proximal to a transmission end of the link to provide a calibration reference against which the output of the other monitors may be compared.

According to a seventh aspect the present invention provides a method of predicting impairments in an optical signal, the method comprising:
  synchronously sampling the optical signal to retrieve a plurality of samples over time; and
  assessing a distribution of the sample sets for indications of optical signal quality, by applying a kernel based machine learning algorithm.

According to an eighth aspect the present invention provides a method of monitoring an optical signal, the method comprising:
  retrieving, at least two tap points, distinct components from the optical signal;
  filtering at least one of the components of the optical signal with an optical filter having a band edge proximal to or less than the bit-rate;

sampling the optical signal from the at least two tap points to retrieve a sample set;
retrieving a plurality of such sample sets over time; and
assessing a distribution of the sample sets for indications of optical signal quality.

The optical filter preferably is a narrowband filter having a bandwidth substantially equal to or less than the bit rate, or optical signal bandwidth. For a DPSK signal the filter edge may be equal to the bit rate.

Embodiments of the eighth aspect are preferably adapted to enable monitoring of optical signals of varying modulation format, such as some or all of DPSK, NRZ, RZ and the like.

Embodiments of the first to eighth aspects of the present invention may be applied in respect of amplitude shift keying (ASK) modulated signals such as return to zero (RZ) or non-return to zero (NRZ) modulated signals, and/or in respect of phase shift keying (PSK)_modulated signals such as differential phase shift keying (DPSK). A modulation scheme of the signal being monitored may be determined by reference to a characteristic shape of the phase portrait obtained.

In some embodiments the present invention may be applied in conjunction with the techniques and disclosure of the International Patent Cooperation Treaty (PCT) Application filed simultaneously with the present application by the present applicants and claiming priority from Australian Provisional Patent Application No 2005905668 filed on 13 Oct. 2005, Australian Provisional Patent Application No 2006901088 filed on 3 Mar. 2006, and an Australian Provisional Patent Application filed on 5 Oct. 2006. The contents of that simultaneously filed PCT Application are incorporated herein by reference.

BRIEF DESCRIPTION OF THE DRAWINGS

An example of the invention will now be described with reference to the accompanying drawings, in which:

FIGS. 49 and 50 illustrate the efficacy of optical impairment prediction using machine learning in accordance with a further embodiment of the invention.

DESCRIPTION OF THE PREFERRED EMBODIMENTS

Figure 1:
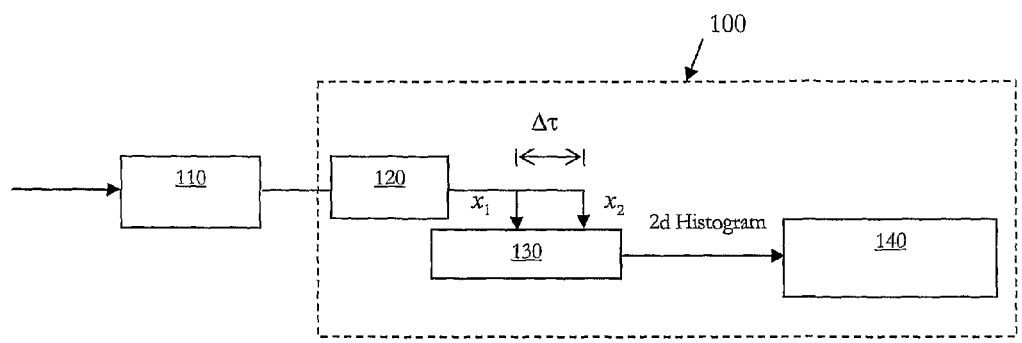
FIG. 1 is a schematic of a two tap asynchronous sampling optical signal monitor in accordance with the present invention.

FIG. 1 is a schematic of a two tap asynchronous sampling optical signal monitor 100 in accordance with the present invention. A small amount of optical power is tapped from a DWDM signal and the optical channel to be monitored is selected by a tunable optical filter 110 and then detected by a high speed receiver 120. The receiver output is passed through a two tap delay line and asynchronously sampled by a dual channel A/D sampler 130, and the sample pairs ($x_{1,n}$, $x_{2,n}$) are then passed to a processor 140 to build a probability density function of numerous such sample sets. If $x(t)$ denotes the optically demultiplexed channel then the sample pairs are given by:

$$x_{1,n} = x(nT_s)$$

$$x_{2,n} = x(nT_s + \Delta\tau)$$

where $\Delta\tau$ denotes the time between taps and $1/T_s$ is the sampling rate. The monitor 100 of FIG. 1 provides a simple implementation of the present invention, by use of a simple two tap delay line after the optical receiver 120 so as to effect the tap delay $\Delta\tau$ in the electrical domain.

Figure 2:
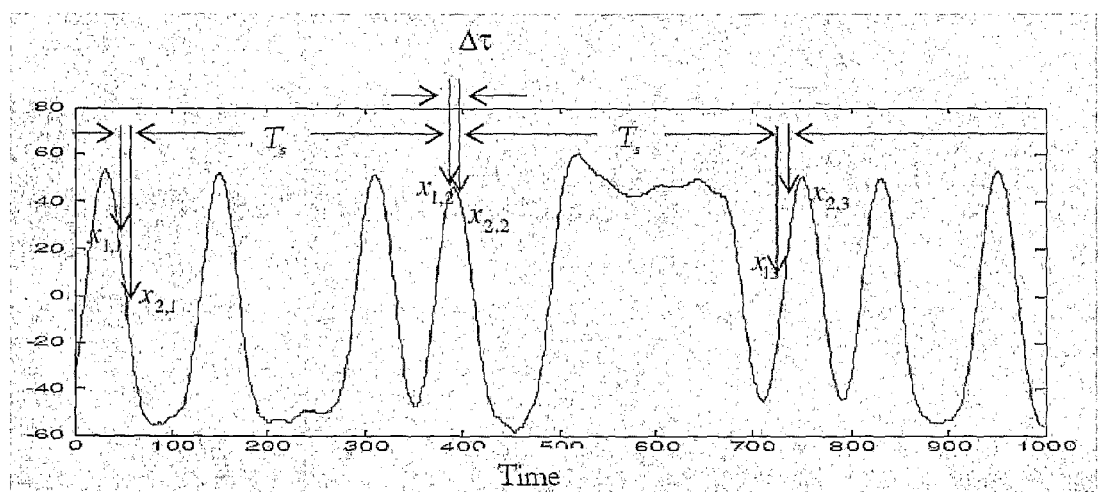
FIG. 2 illustrates sampling of an optical signal by the monitor of FIG. 1 with tap delay $\Delta\tau$ and sampling interval $T_s$.

FIG. 2 illustrates the timing of sampling of the optical signal by the monitor 100 of FIG. 1, in obtaining three sample pairs, namely ($x_{1,1}$, $x_{2,1}$), ($x_{1,2}$, $x_{2,2}$) and ($x_{1,3}$, $x_{2,3}$). It is to be noted that the time scale of FIG. 2 is not to scale in respect of $T_s$, as in the present embodiment the sampling rate $1/T_s$ is orders of magnitude slower than the bit rate, with many thousands of bits between samples. The sampling rate $1/T_s$ is unrelated to the bit rate, such that asynchronous sampling is performed.

In the embodiment shown in FIG. 2, the tap delay $\Delta\tau$ is a small fraction of the bit period, in effect giving an approximate measure of the slope and amplitude of the waveform. The tap delay $\Delta\tau$ may in other embodiments be larger than a fraction of a bit period, for example the tap delay $\Delta\tau$ may be approximately the same as the bit period.

Figure 3A:
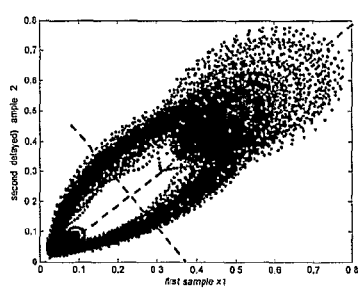
FIGS. 3a to 3f illustrate a comparison between the impact of multiple mechanism degradation upon the asynchronous sampling technique of the monitor of FIG. 1, upon a synchronous sampling oscilloscope eye diagram, and upon a histogram of single tap asynchronous samples, respectively.
Figure 3B:
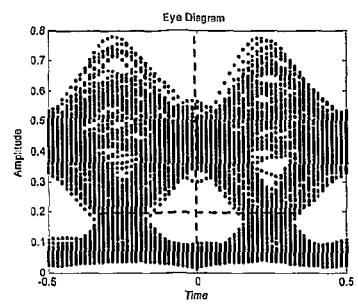
Figure 3C:
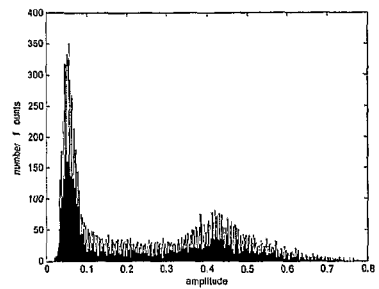
Figure 3D:
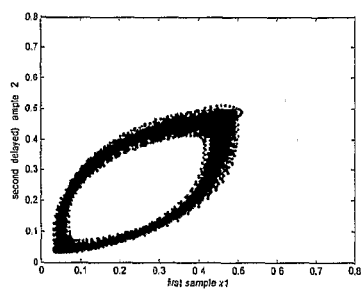

Processor 140 builds a histogram representing the probability density function of the sample pairs, in the form of a two dimensional scatter plot of $x_2$ vs. $x_1$, also referred to as a two dimensional histogram of ($x_1$, $x_2$). FIGS. 3a and 3d illustrate such plots of the probability density function of the sample pairs. FIG. 3a is a representation of the signal obtained by two point asynchronous sampling of a simulated 10 Gbit/s non return to zero (NRZ) channel that is distorted by a combination of degradation sources including dispersion (1600 ps/nm), amplifier spontaneous emission (ASE) noise (OSNR=31 dB) and 1st order polarisation mode dispersion (PMD=20 ps). The tap delay $\Delta\tau$ has been set at ⅛th of a bit period. FIG. 3b illustrates an eye diagram obtained from the same distorted signal by a synchronous sampling oscilloscope, and FIG. 3c illustrates a histogram obtained from single tap sampling of the same distorted signal. Notably, a measure of signal quality (Q values and timing jitter) can be found from an assessment of the distribution of points along the dashed lines shown in FIG. 3a, such that the present invention provides a measure of such signal quality in an analogous manner to an assessment of the dashed lines shown in FIG. 3b.

Figure 3E:
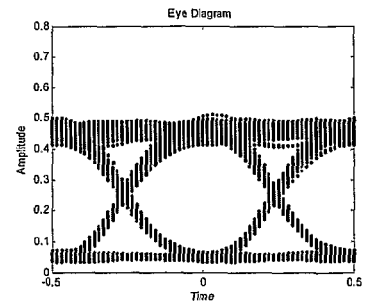
Figure 3F:
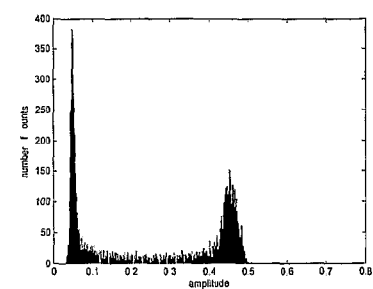

FIG. 3d is a plot obtained in accordance with the present invention by asynchronous sampling of a simulated clean 10 Gbit/s NRZ channel with negligible noise and distortion, FIG. 3e illustrates an eye diagram obtained from the same clean signal by a synchronous sampling oscilloscope, and FIG. 3f illustrates a one dimensional histogram of the same clean signal. A comparison of FIG. 3a to FIG. 3d illustrates the impact of the stated degradation mechanisms on the representation of the signal provided by the present invention. Similar comparisons can be made between FIGS. 3b and 3e, and between FIGS. 3f and 3c. The nature of the impairments can be investigated by analysing the two dimensional histogram of the pairs of samples shown in FIGS. 3a and 3d. Unlike one dimensional histogram techniques such as that shown in FIGS. 3c and 3f, the two dimensional histograms of FIGS. 3a and 3d contain information about the pulse shape, in particular the rise and fall regions which often provide useful signatures of the magnitude and nature of the impairment.

An advantage of the known synchronous sampling producing FIGS. 3b and 3e is that it gives a direct measure of the waveform properties that are directly related to the bit error rate (BER). In particular, the synchronous sampling scope can produce histograms of the signal amplitude at any time slice within the bit period. A histogram measure at the centre of the eye (indicated by the vertical dashed line in FIG. 3b) can be used to determine a Q value which is a commonly used estimate of the BER. In contrast, information about the eye opening in the one dimensional asynchronous histogram is obscured by the transition regions as illustrated in FIGS. 3c and 3f.

While the present embodiment undertakes asynchronous sampling and thus does not give a direct measure of the amplitude distribution at the centre of the eye, the present invention does however enable measurement of conditional probability distributions that can give similar information. For example it is possible to measure the distribution of sample pairs that are similar in amplitude, which effectively is a measure of the distribution of points along the long dashed line or major axis in FIG. 3a. For a small time delay (say, $\Delta\tau \leq \frac{1}{8}$ bit period) this is equivalent to sampling the waveforms at regions of zero slope. Since these regions tend to occur at the centre of the eye, this distribution can give a measure of the eye opening.

Timing jitter or the distribution of zero crossing times is another common measure of signal quality extracted from eye diagrams. Similar information can be obtained from the present embodiment of the invention by measuring the distribution of points along the short dashed line or minor axis in FIG. 3a.

In addition to the valuable application of BER estimation, further embodiments of the invention enable diagnostic differentiation between different impairment mechanisms. FIGS. 4a, 5a, 6a and 7a illustrate the identifiable manner in which scatter plots of the two tap asynchronous sampling technique of the present invention are affected when the monitored signal is distorted by dispersion. FIGS. 4b, 5b, 6b and 7b illustrate the largely ambiguous impact of the same signal distortion caused by dispersion upon a synchronous eye diagram.

Figure 4A:
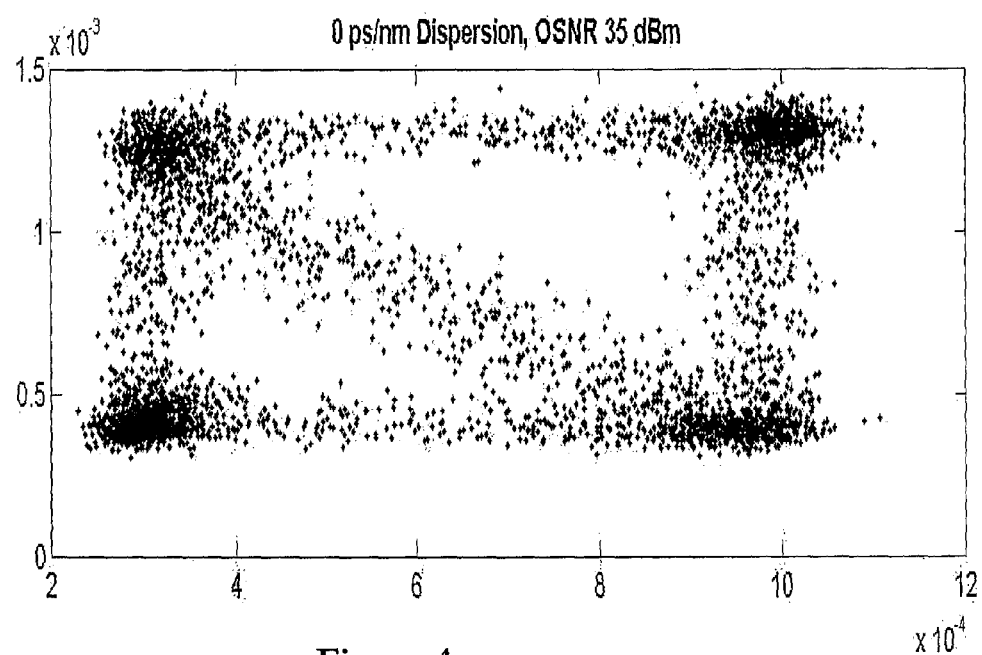
FIGS. 4a and 4b illustrate an experimental scatter plot of $x_2$ vs. $x_1$ in accordance with the present invention, and the corresponding eye diagram from a synchronous sampling oscilloscope, respectively, in the presence of 35 dB OSNR.

FIG. 4a is a scatter plot of $x_2$ vs. $x_1$ obtained from an optical signal in accordance with the present invention, the optical signal possessing an OSNR of 35 dB and suffering from no dispersion. In obtaining the scatter plot of FIG. 4, the tap delay was effected in the optical domain. An erbium doped fibre amplifier was used to boost the optical signal to be monitored to overcome the losses of a variable optical delay. The boosted optical signal was then split equally along two paths by a 3 dB coupler. One of the paths was subject to the variable optical delay line to effect a variable tap delay $\Delta t$. The other path was attenuated to match the losses of the variable optical delay. The two optical paths were then sampled by a digital communications analyser (DCA) with two optical inputs, allowing the two tap plots to be displayed directly. The DCA was triggered asynchronously by a separate 50 MHz signal generator.

As the tap delay $\Delta\tau$ was set to be substantially equal to 1 bit period in generating FIGS. 4a, 5a, 6a and 7a, a substantially rectangular scatter plot is produced with the four corners of the rectangle corresponding to normalised sample sets of (0, 0), (0, 1), (1,0) and (1, 1), with asynchronous samples also occurring along all possible transitions between these points. Notably the transition between (0, 0) and (1, 1) is not possible and thus only one diagonal transition is present, being the transition between (0, 1) and (1, 0). This diagonal transition will be seen in the subsequent figures to be an important identifier of dispersion when $\Delta\tau$ is substantially equal to 1 bit period. Specifically, samples falling upon the diagonal transition indicate occurrence of a bit sequence of either 010 or 101. Under some impairments these two different bit sequences may have differing characteristic rise times and fall times, which may be distinguishable in the scatter plot by a dividing or broadening of the diagonal transition.

It is noted that all vertical and horizontal transitions are possible in one direction only, whereas the diagonal transition between (1, 0) and (0, 1) can occur in either direction and can thus be expected to have substantially twice the sample density of the vertical and horizontal transitions.

Figure 4B:
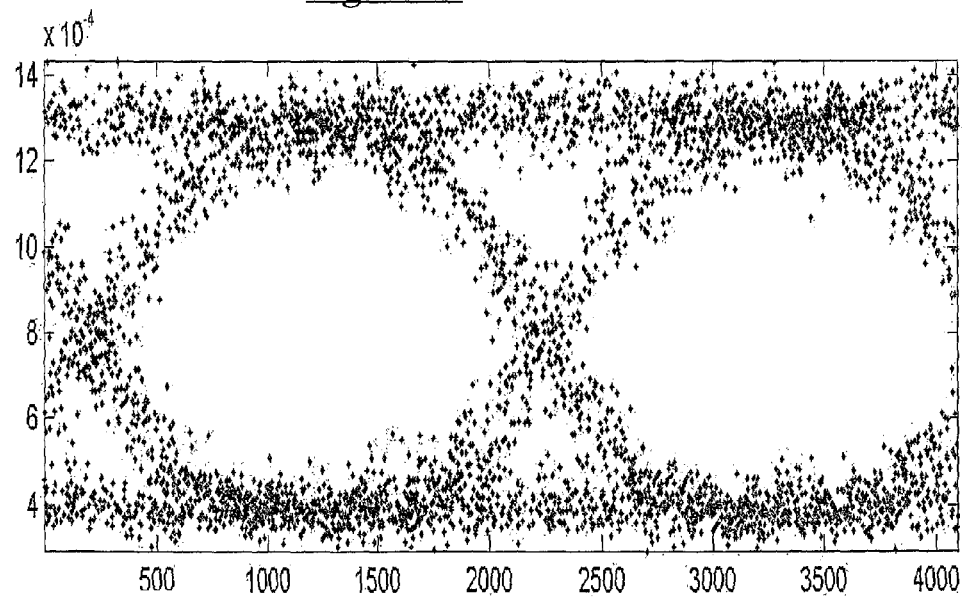

FIG. 4b illustrates the corresponding eye diagram from a synchronous sampling oscilloscope produced by the same optical signal as was sampled to produce FIG. 4a.

Figure 5A:
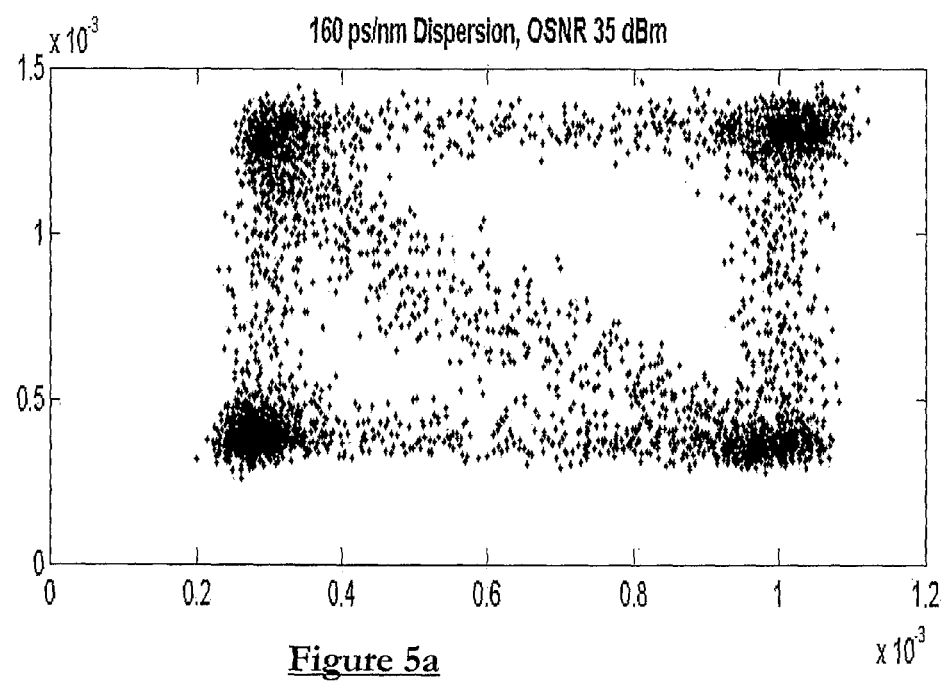
FIGS. 5a and 5b illustrate an experimental scatter plot of $x_2$ vs. $x_1$ in accordance with the present invention, and the corresponding eye diagram from a synchronous sampling oscilloscope, respectively, in the presence of 35 dB OSNR and 160 ps/nm dispersion.
Figure 5B:
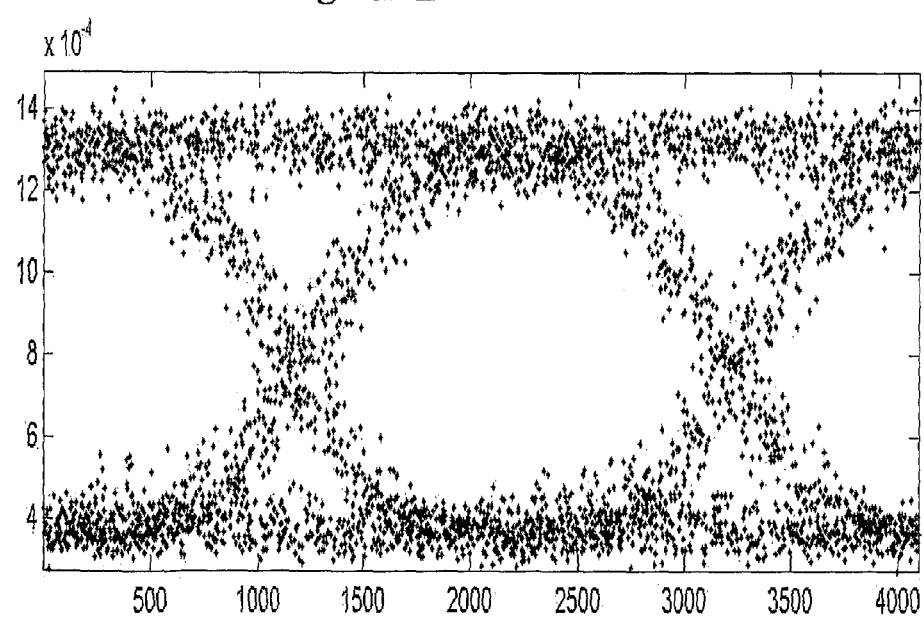

FIG. 5a is a scatter plot of $x_2$ vs. $x_1$ obtained in accordance with the present invention from a similar optical signal as was monitored to produce FIGS. 4a and 4b, with the signal now suffering from 160 ps/nm dispersion. Deviation of the diagonal transition in the form of curvature towards the origin is already somewhat evident. FIG. 5b is the corresponding eye diagram from a synchronous sampling oscilloscope of the same signal. In contrast to FIG. 5a, no particular feature to enable diagnosis of dispersion is evident in the eye diagram of FIG. 5b.

Figure 6A:
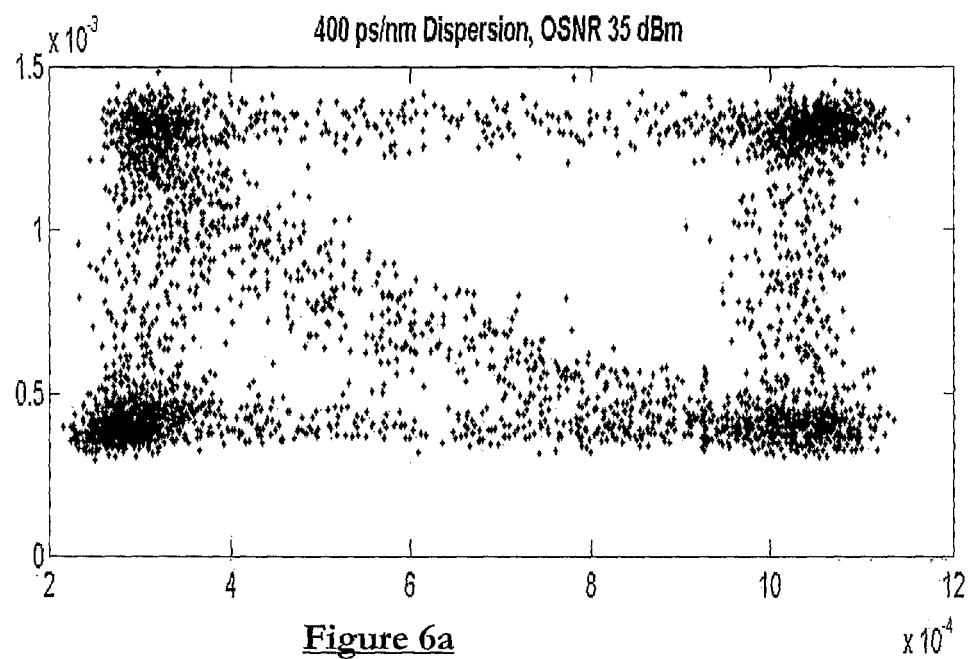
FIGS. 6a and 6b illustrate an experimental scatter plot of $x_2$ vs. $x_1$ in accordance with the present invention, and the corresponding eye diagram from a synchronous sampling oscilloscope, respectively, in the presence of 35 dB OSNR and 400 ps/nm dispersion.
Figure 6B:
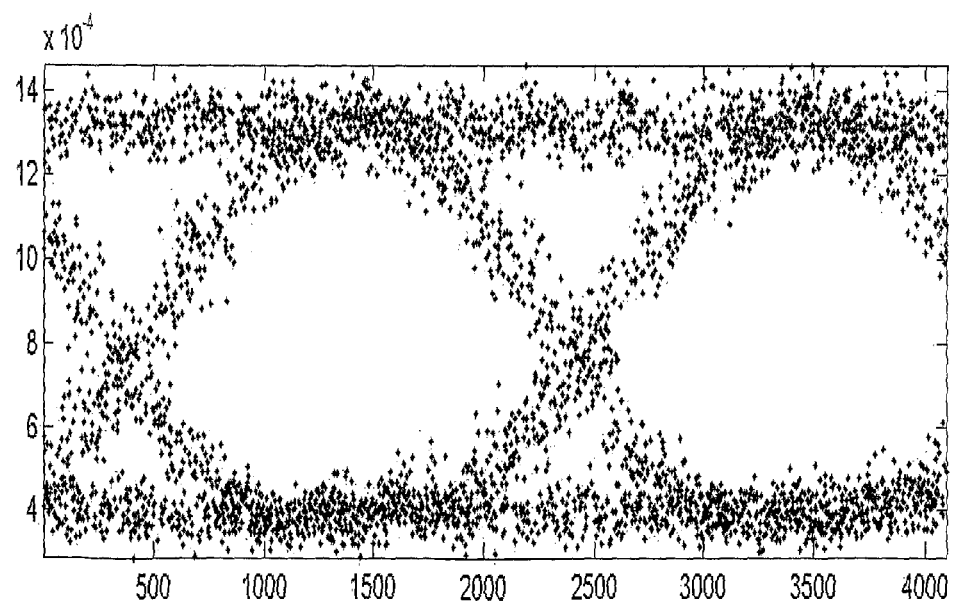

FIG. 6a is a scatter plot of $x_2$ vs. $x_1$ obtained in accordance with the present invention from a similar optical signal as was monitored to produce FIGS. 4a, 4b, 5a and 5b except with the signal now suffering from 400 ps/nm dispersion. Deviation of the diagonal transition in the form of curvature towards the origin is increasingly evident. FIG. 6b is the corresponding eye diagram from a synchronous sampling oscilloscope of the same distorted signal. The eye diagram of FIG. 6b shows some narrowing of the data peaks and broadening of the data troughs, however this feature is unclear.

Figure 7A:
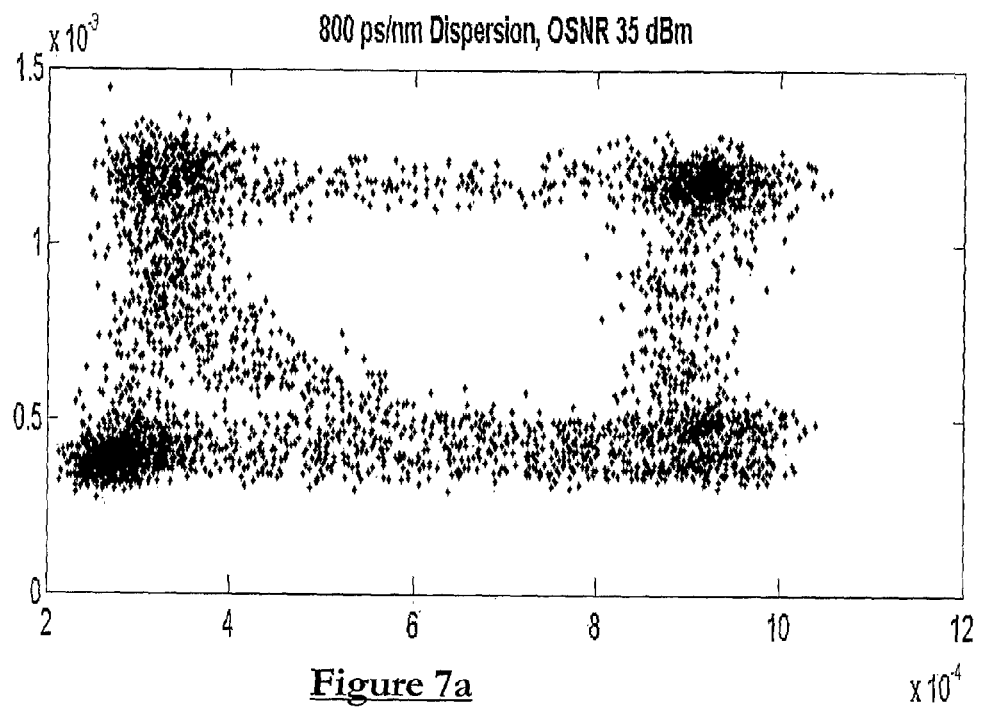
FIGS. 7a and 7b illustrate an experimental scatter plot of $x_2$ vs. $x_1$ in accordance with the present invention, and the corresponding eye diagram from a synchronous sampling oscilloscope, respectively, in the presence of 35 dB OSNR and 800 ps/nm dispersion.
Figure 7B:
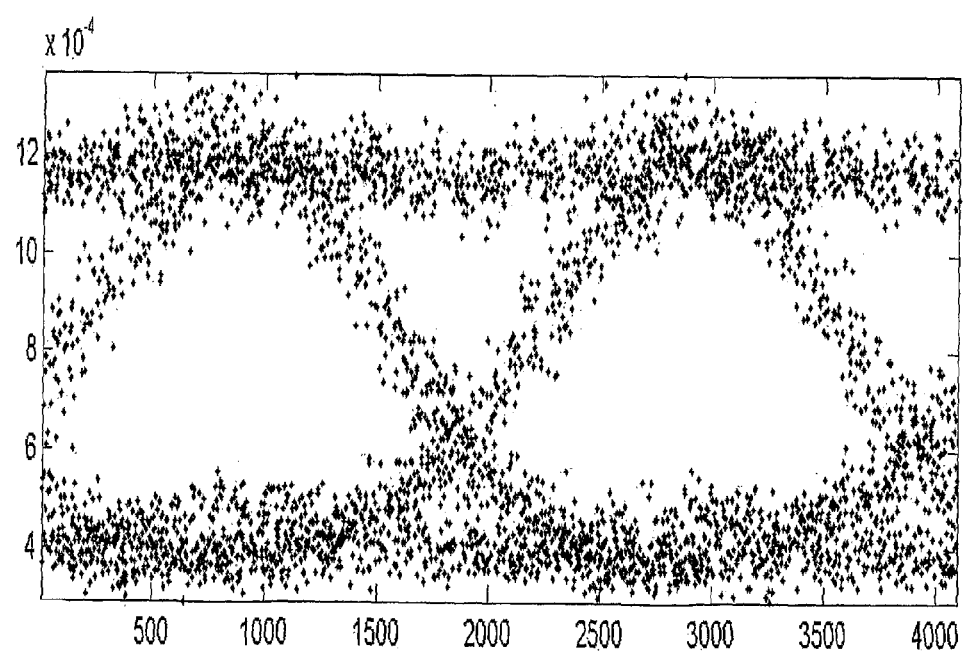

FIG. 7a is a scatter plot of $x_2$ vs. $x_1$ obtained in accordance with the present invention from a similar optical signal as was monitored to produce FIGS. 4a, 4b, 5a, 5b, 6a and 6b, except with the signal now suffering from 800 ps/nm dispersion. Deviation of the diagonal transition in the form of curvature towards the origin is pronounced and presents a feature by which dispersion may be diagnosed. FIG. 7b is the corresponding eye diagram from a synchronous sampling oscilloscope of the same signal. The eye diagram of FIG. 7b shows further narrowing of the data peaks and broadening of the data troughs when compared to FIG. 6b. While this feature can enable diagnosis of dispersion, it is difficult to quantify the amount of dispersion present.

It is to be noted that scatter plots obtained with a tap delay of 1 bit period, as shown in FIGS. 4 to 7, enable analysis of further characteristics of the sampled optical signal. For example, an assessment of scatter at the vertices (0, 1) and/or (1, 0) may enable correlation information to be retrieved, such as whether a low 0 precedes a low 1.

Figure 8:
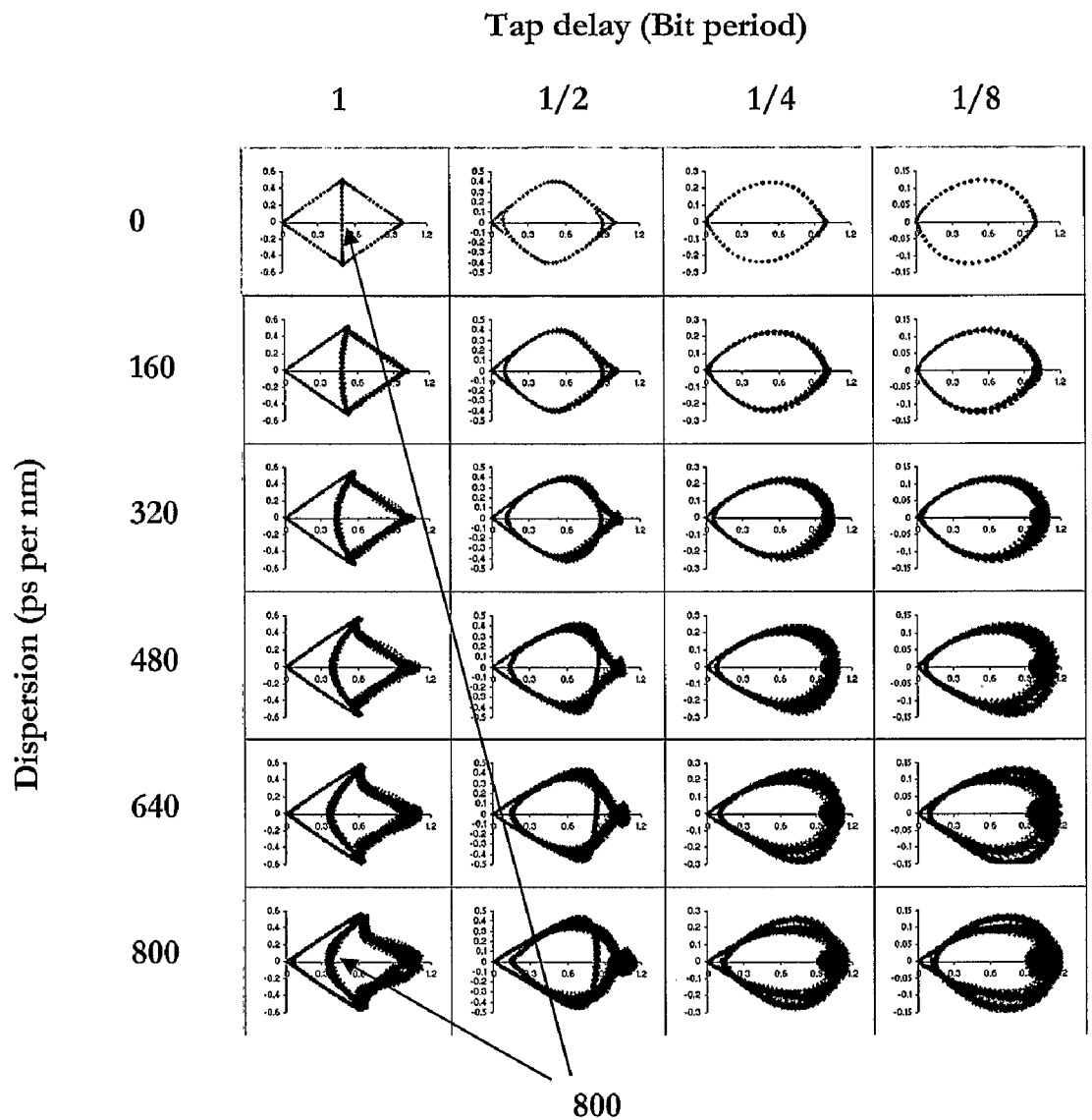
FIG. 8 illustrates the impact of dispersion upon simulated scatter plots of $(x_1-x_2)$ vs. $(x_1+x_2)$ for tap delays of 1 bit period, ½ bit period, ¼ bit period and ⅛ bit period.
Figure 9:
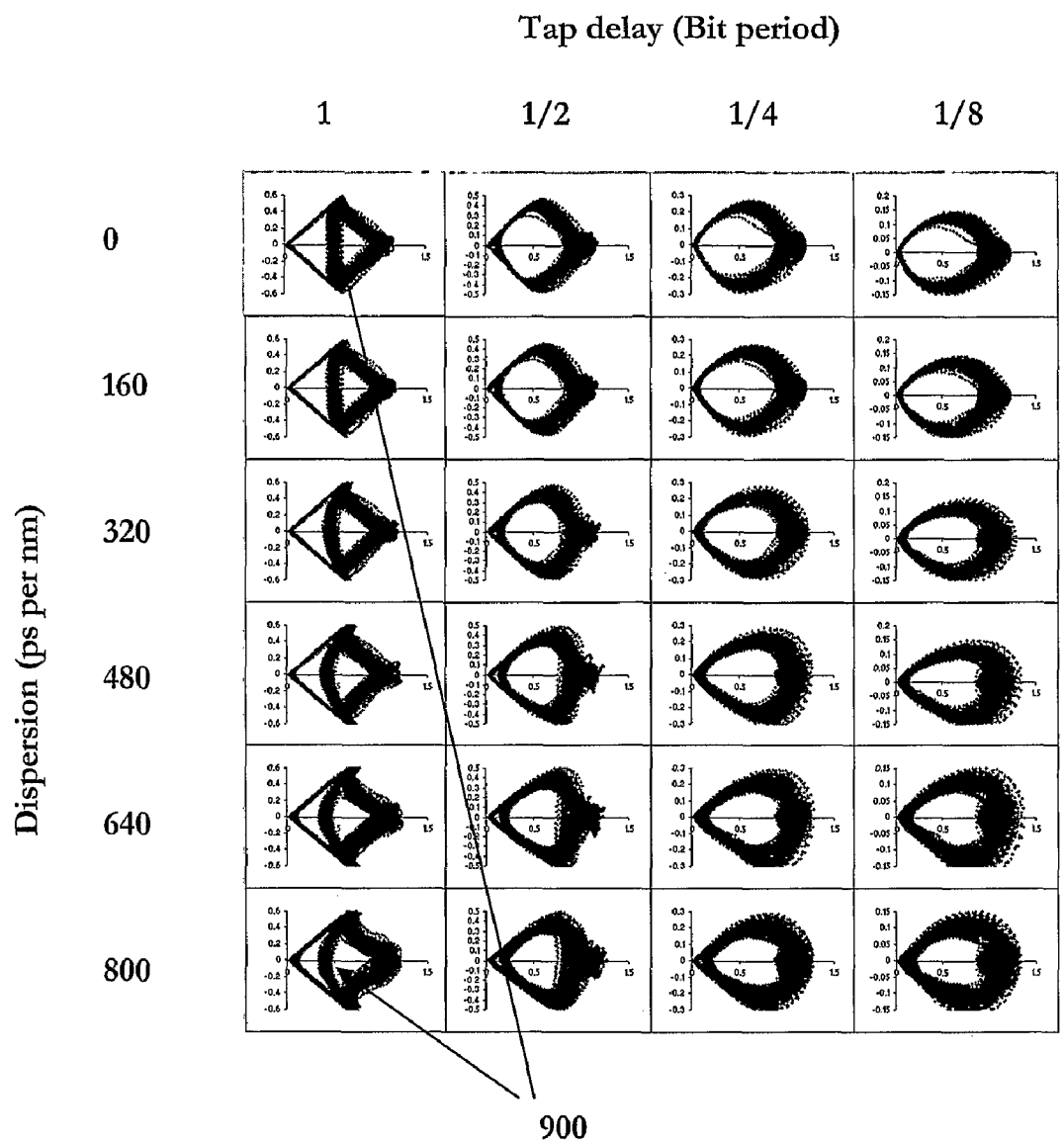
FIG. 9 illustrates the impact of dispersion upon simulated scatter plots of $(x_1-x_2)$ vs. $(x_1+x_2)$ for tap delays of 1 bit period, ½ bit period, ¼ bit period and ⅛ bit period, in the presence of ASE.

Further simulations illustrating the asynchronous monitor's ability to differentiate the type and magnitude of impairments is shown in FIGS. 8 to 11. FIGS. 8 and 9 are each an array of scatter plots. Rather than plotting $x_2$ vs. $x_1$ as shown in FIGS. 4 to 7, the plots of FIGS. 8 and 9 are of $(x_1 - x_2)$ vs. $(x_1 + x_2)$, which can be visualised as substantially rotating the rectangle of FIG. 4a such that the (0, 0) and (1, 1) points are each plotted on the horizontal axis. Scatter plots in each column of FIGS. 8 and 9 have been obtained with a common tap delay, from left to right being $\Delta\tau = 1$ bit period, $\Delta\tau = \frac{1}{2}$ bit period, $\Delta\tau = \frac{1}{4}$ bit period and $\Delta\tau = \frac{1}{8}$ bit period. Each row of scatter plots is obtained from a signal subject to a common amount of dispersion, from top to bottom being 0 ps/nm, 160 ps/nm, 320 ps/nm, 480 ps/nm, 640 ps/nm and 800 ps/nm.

FIGS. 8 and 9 reinforce the results of FIGS. 4 to 7, in showing that the transition between (1, 0) and (0, 1), is a potential feature for diagnosing and monitoring dispersion. That is, dispersion has an identifiable signature on this transition in causing curvature towards the origin of the plot, as indicated at 800. While the signals sampled to produce the scatter plots of FIG. 8 were subject to no amplifier spontaneous emission (ASE), it is important to note that the signature of dispersion upon the (1, 0)-to-(0, 1) transition is still evident in the presence of ASE noise (OSNR=22 dB) as illustrated in FIG. 9 and indicated by 900. Other measures such as the degree of symmetry may also be useful distinguishing features.

Figure 10:
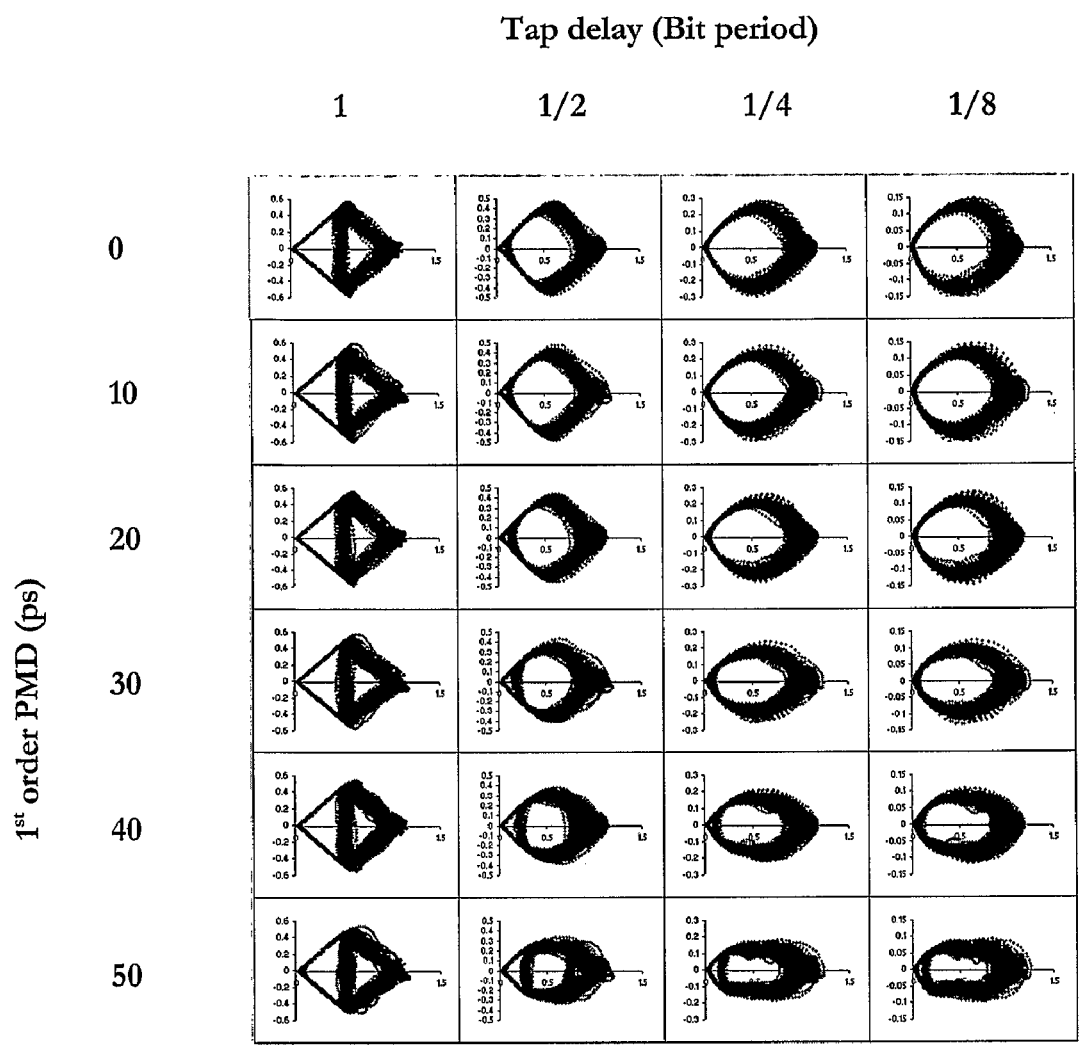
FIG. 10 illustrates the impact of first order PMD upon simulated scatter plots of $(x_1-x_2)$ vs. $(x_1+x_2)$ for tap delays of 1 bit period, ½ bit period, ¼ bit period and ⅛ bit period, in the presence of ASE.

FIG. 10 illustrates the impact of first order PMD upon plots of $(x_1-x_2)$ vs. $(x_1+x_2)$ for tap delays of 1 bit period, ½ bit period, ¼ bit period and ⅛ bit period, in the presence of ASE (OSNR=22 dB). Notably, as first order PMD increases from 0 to 50 ps, the scatter plots suffer notable flattening for tap delays of ½ bit period or less. That is, the (1, 0) region of the scatter plot moves towards the horizontal axis with increasing first order PMD, as does the (0, 1) region of the scatter plot. Once again, this or other signatures in the scatter plots may be useful in diagnosing first order PMD, even in the presence of other degradation mechanisms such as ASE.

Figure 11:
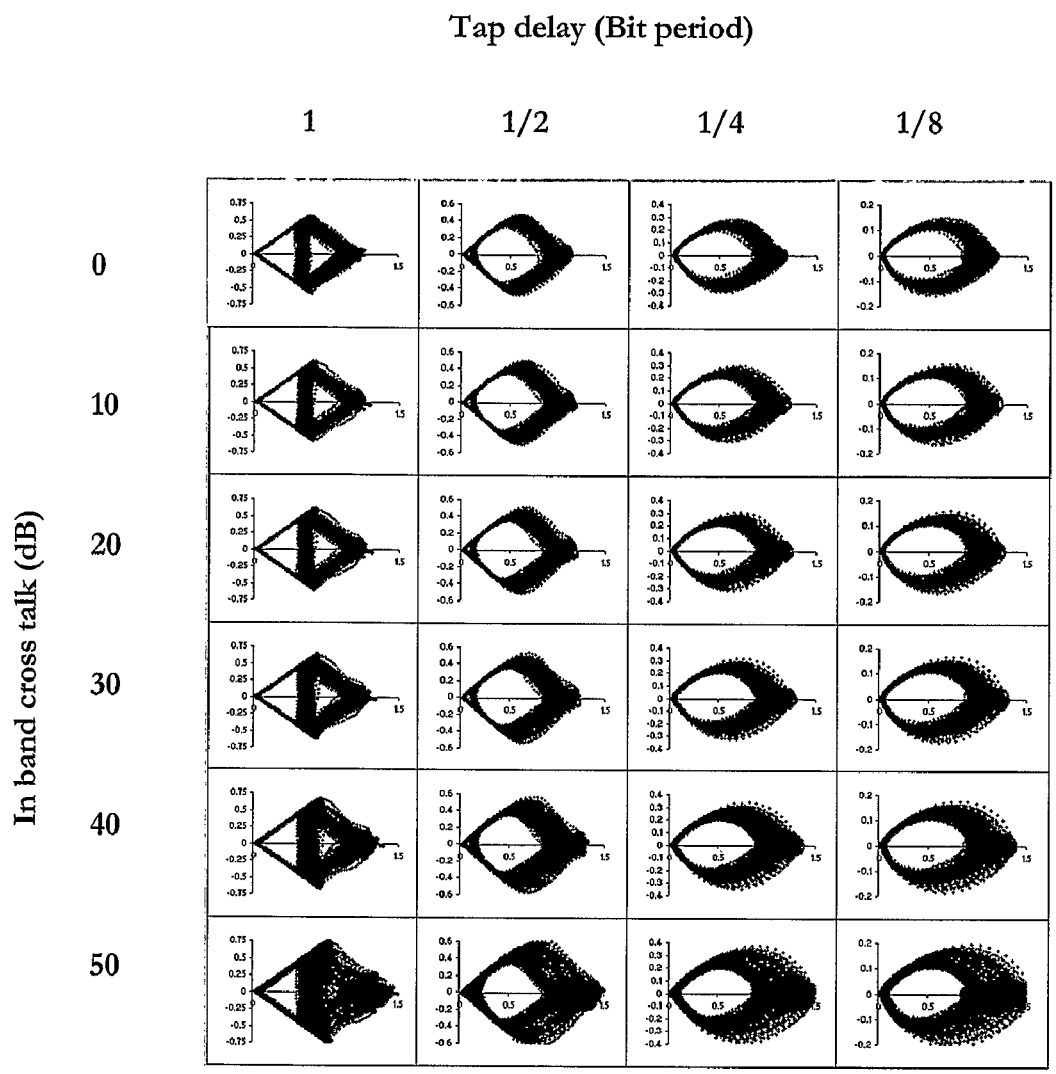
FIG. 11 illustrates the impact of in-band crosstalk upon simulated scatter plots of $(x_1-x_2)$ vs. $(x_1+x_2)$ for tap delays of 1 bit period, ½ bit period, ¼ bit period and ⅛ bit period.

FIG. 11 illustrates the impact of in-band crosstalk upon plots of $(x_1-x_2)$ vs. $(x_1+x_2)$ for tap delays of 1 bit period, ½ bit period, ¼ bit period and ⅛ bit period. A visual inspection of the two dimensional plots shows in-band crosstalk has a similar impact as ASE. Thus, in-band crosstalk is unlikely to be misdiagnosed as dispersion or first order PMD. While differentiating between in-band crosstalk and ASE may be difficult from the two dimensional plots of FIG. 11, extracting further information from the plurality of sample pairs may assist, for example a 3 dimensional scatter plot may be constructed in which sample density is plotted as the third dimension.

Figure 12:
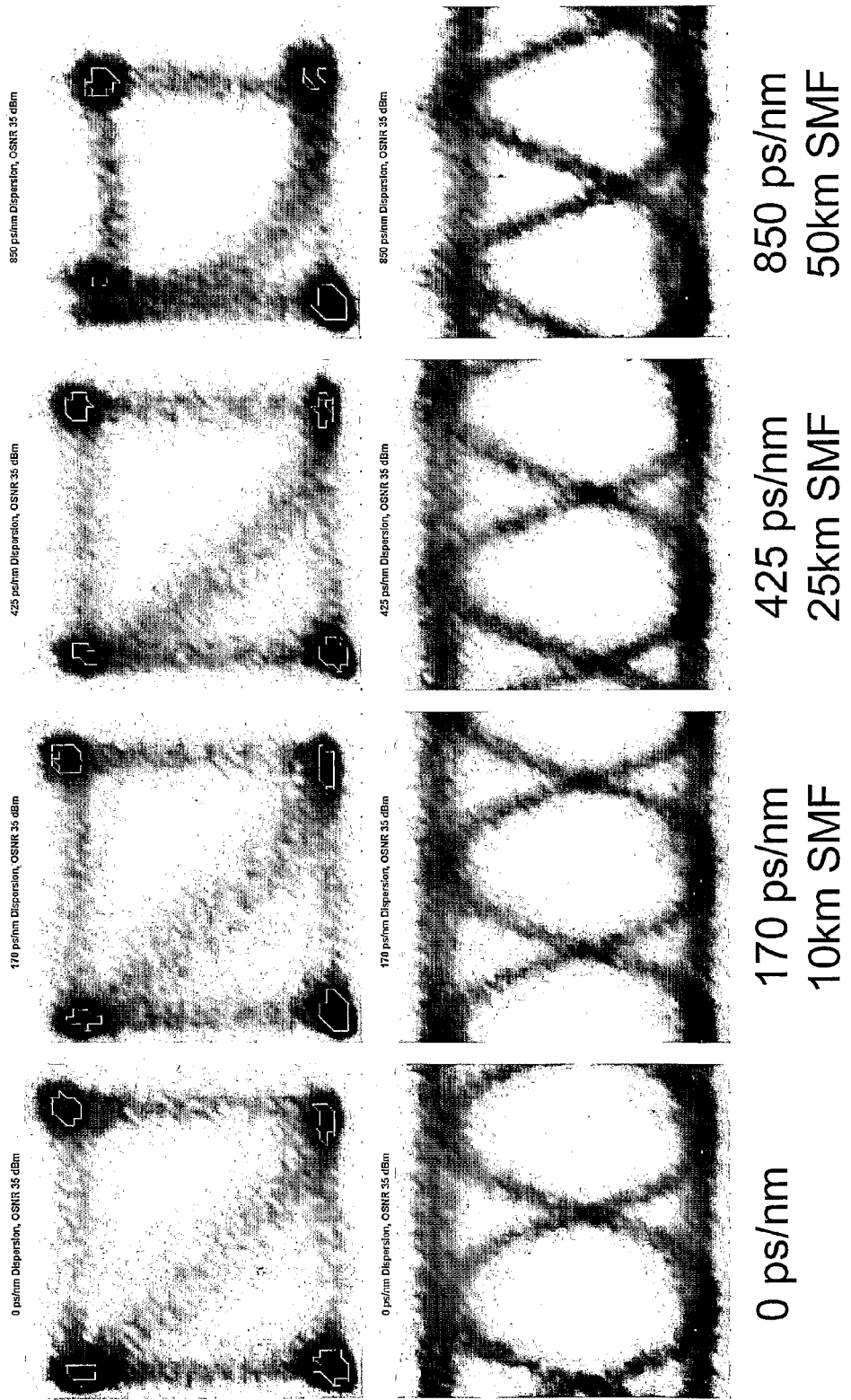
FIG. 12 provides a further illustration of the impact of dispersion upon a greyscale density scatter plot of the present invention, compared to a synchronous eye diagram.

FIG. 12 provides a further comparison of the impact of dispersion upon the scatter plot of the present invention and a synchronous eye diagram. The upper four density histograms have been obtained from the same sample data as FIGS. 4a, 5a, 6a and 7a, that is, from two-tap sampling of 10 Gbit/s NRZ modulated data with $\Delta\tau$=1 bit period. The density histograms of FIG. 12 thus provide an alternate representation of the scatter plots of FIGS. 4a, 5a, 6a and 7a. The lower four plots of FIG. 12 are each a synchronous eye diagram obtained from the same signal as the respective density histogram above. From left to right, the signal sampled to obtain the density histogram and synchronous eye diagram in each column was subject to a dispersion level of 0 ps/nm, 160 ps/nm, 400 ps/nm and 800 ps/nm, respectively. Notably, the triangle in the lower left corner of each histogram undergoes significant 'closure' with increasing dispersion, as the diagonal transition curves towards the origin. On the other hand, the impact of such dispersion upon the eye diagrams is barely distinguishable.

Figure 13:
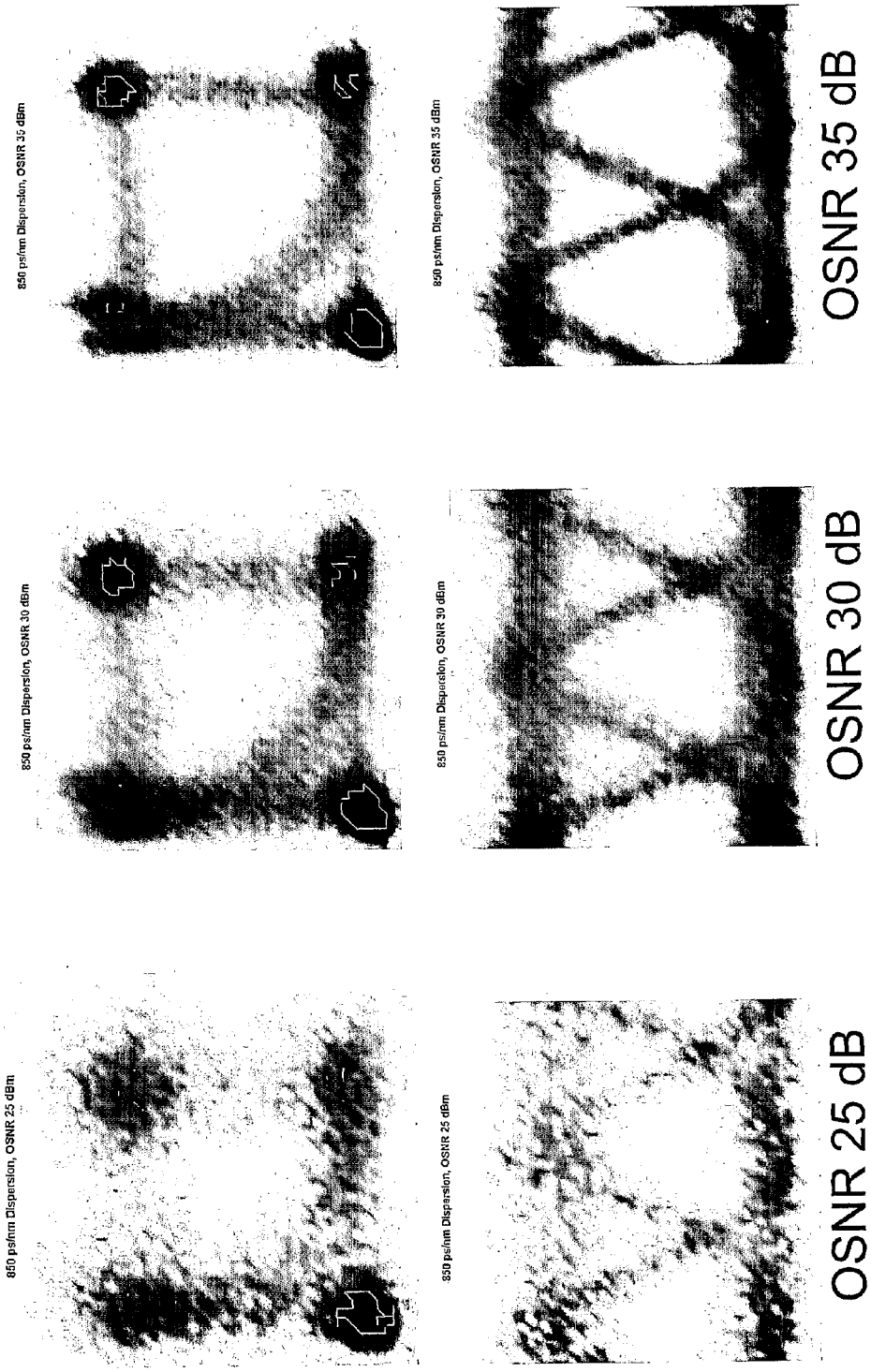
FIG. 13 illustrates the impact of dispersion upon a greyscale density scatter plot of the present invention under varying levels of OSNR, compared to a synchronous eye diagram.

FIG. 13 illustrates the impact of dispersion upon the density histogram of the present invention under varying levels of OSNR, compared to a synchronous eye diagram. All density histograms and eye diagrams of FIG. 13 have been obtained from 10 Gbit/s NRZ modulated data having net dispersion of 800 ps/nm. From left to right, the signal sampled to obtain the density histogram and synchronous eye diagram in each column possessed an OSNR of 25 dB, 30 dB and 35 dB, respectively. Again, the signature feature of dispersion in the two tap histograms, namely curvature of the diagonal transition towards the origin, is still plainly distinguishable even in adverse OSNR conditions. Once again, by contrast the eye diagrams show narrowing of the data peaks and broadening of the bases, but provide insufficient information to quantify the amount of dispersion present.

An extra degree of freedom can be obtained by incorporating an adjustable delay $\Delta\tau$. For example FIGS. 8 and 9 suggest that the signature of dispersion is best seen with a delay $\Delta\tau$ equal to one bit period, whilst FIG. 10 indicates that the signature for first order PMD is best seen with a delay of ¼ bit period or less. The extra degree of freedom of an adjustable delay $\Delta\tau$ may thus be useful in separating and individually diagnosing combined sources of degradation.

Figure 14:
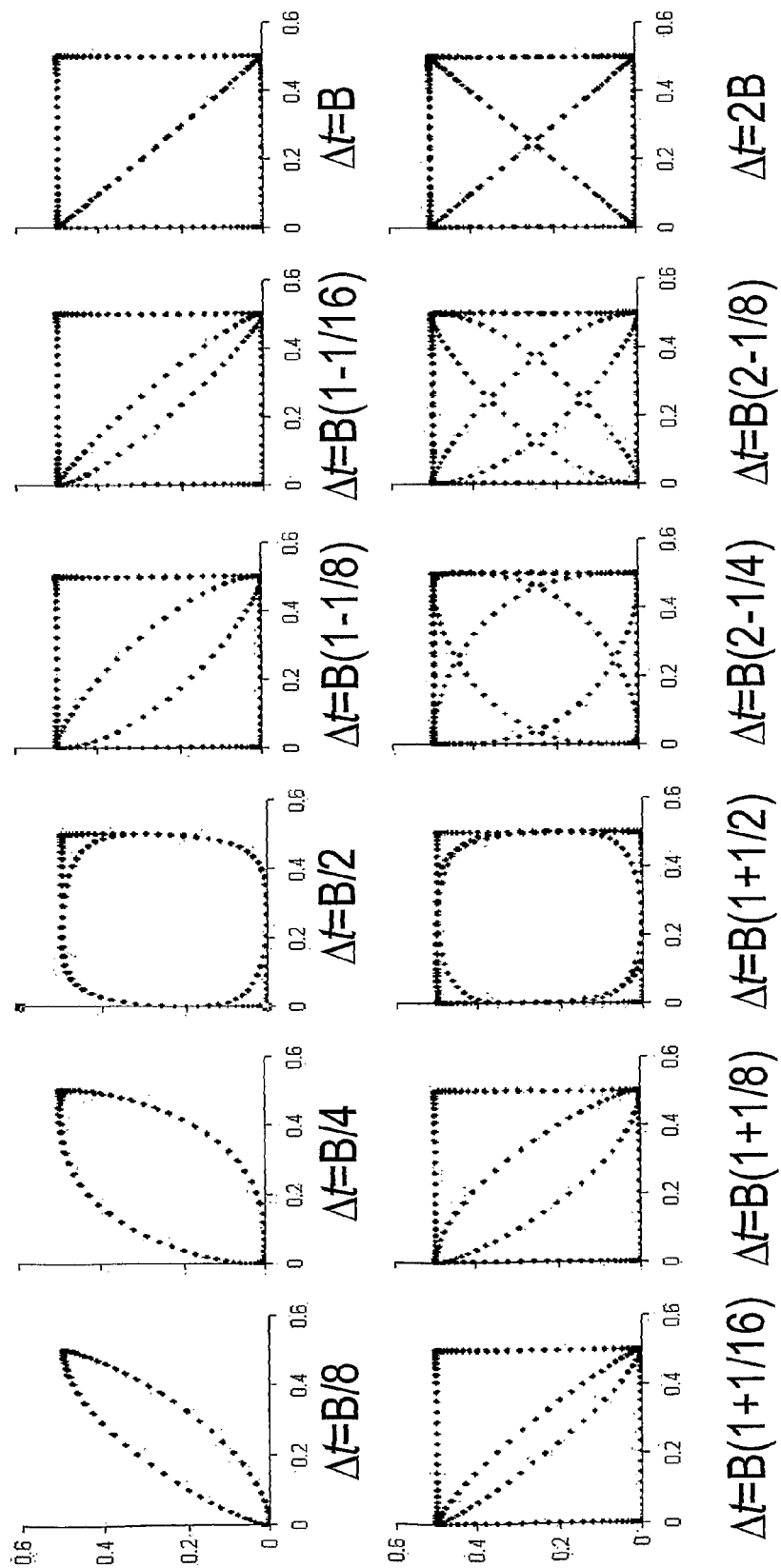
FIG. 14 illustrates the change in shape of the scatter plot with varying tap delay.

FIG. 14 illustrates the change in shape of the scatter plot with varying tap delay, for an unimpaired signal. In FIG. 14, scatter plots are shown for each respective tap delay $\Delta t$=B/8, B/4, B/2 7B/8, 15B/16, B, 17B/16, 9B/8, 3B/2, 7B/4, 15B/8 and 2B, where B is the bit rate. It is again noted that for a delay of exactly one bit ($\Delta t$=B), a unique pattern forms. Thus, formation of this unique pattern can be used to confirm that a tap delay is equal to the bit rate, so that knowledge of the tap delay enables diagnostic determination of the bit rate. Notably, the pattern for tap delay of two bits ($\Delta t$=2B) is distinct from the pattern for tap delay equal to one bit, in that the former possesses both diagonal transitions whereas the latter possesses only one diagonal transition. As can be seen for the scatter plots of $\Delta t$=15B/16 and 17B/16, even slight variations of tap delay away from 1 bit period causes loss of the degeneracy of the diagonal transition, which becomes two separate curves.

For delays less than B/2, the plots are representative of the power evolution within each bit. The waveform increases along the lower curve for a 0→1 transition, and falls back along the upper curve for the 1→0 transition.

While the preceding embodiments have been described with reference to a monitor possessing two sample taps, it is to be noted that alternate embodiments of the invention may extract more information about the waveform, and about distortion of the waveform, by using an increased number of taps. For example three taps could yield information regarding the distribution of curvatures.

Thus, the present invention enables diagnostic differentiation between degradation types (ASE vs. dispersion vs. PMD vs. in-band crosstalk etc). This is an important capability in the field of optical networks, with potential to be of increasing value as multipath optical networks become increasingly sophisticated.

While the preceding description of the preferred embodiments, and attached FIGS. 1 to 14, relate to two tap sampling with a time delay between the taps, it is to be appreciated that other embodiments of the present invention may utilise tap points which are distinct from each other in an alternative way. For example, a range of optical and/or electrical pre-processing of the signal may be performed prior to the sampling tap points.

Figure 15:
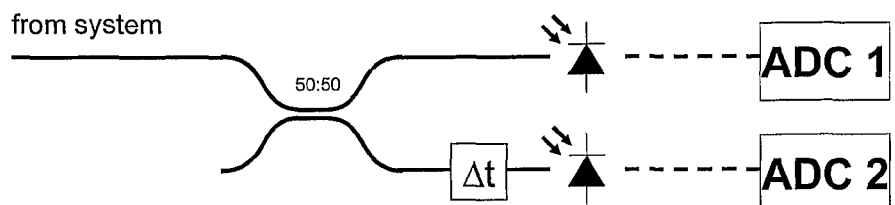
FIG. 15 illustrates two alternate embodiments of two tap asynchronous sampling optical signal monitors in accordance with the present invention.
Figure 15:
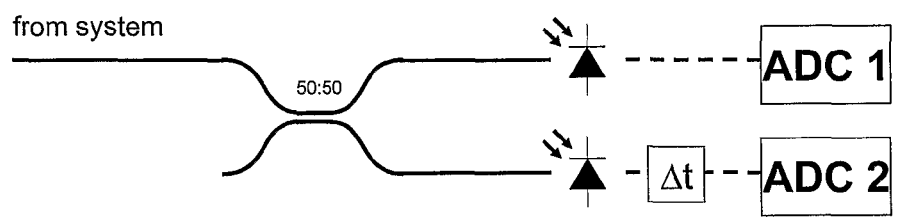

FIG. 15 illustrates two alternative implementations, in which an optical signal obtained from an optical communications system is split into two arms, with one of the arms being subject to a time delay, either in the optical domain (upper schematic), or in the electrical domain (lower schematic). Both arms are converted from the optical domain to the electrical domain by a photodetector, and are later digitised by ADCs for processing.

Figure 16:
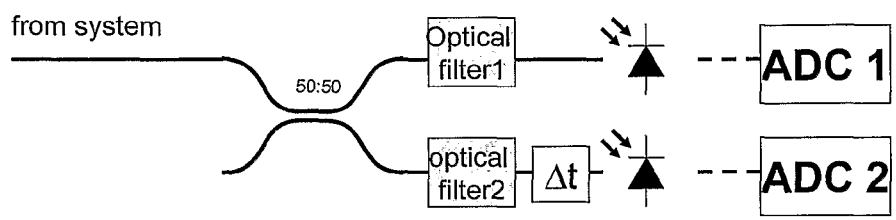
FIG. 16 illustrates two further embodiments of two tap asynchronous sampling optical signal monitors in accordance with the present invention.
Figure 16:
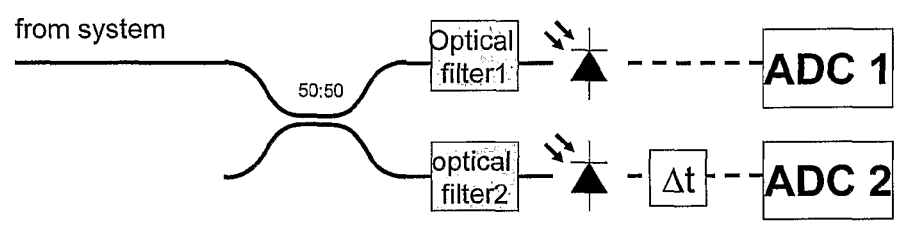

FIG. 16 illustrates further embodiments of the invention, in which each arm is subject to optical filtering by a distinct optical filter. Once again one of the arms may be subject to a time delay, either in the optical domain (upper schematic), or in the electrical domain (lower schematic). The two filters may have distinct characteristics, for example a different centre frequency, and in such embodiments the time delay $\Delta\tau$ may be set to zero.

Figure 17:
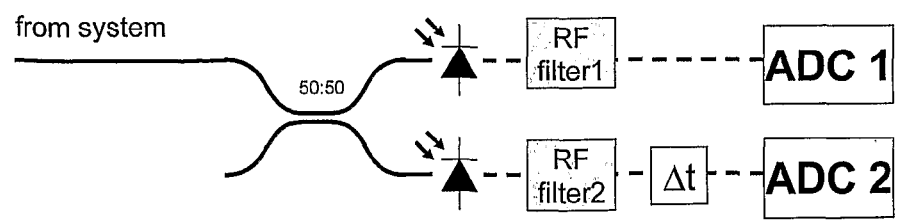
FIG. 17 illustrates another embodiment of a two tap asynchronous sampling optical signal monitor in accordance with the present invention.
Figure 18:
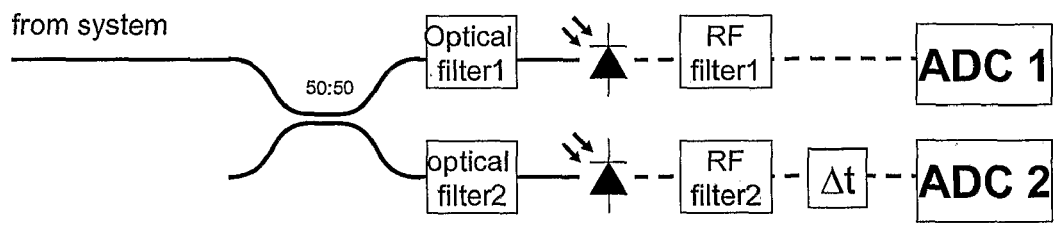
FIG. 18 illustrates yet another embodiment of a two tap asynchronous sampling optical signal monitor in accordance with the present invention.

In FIG. 17, electrical filters are positioned after the photodetectors and precede the A/D sampling. The electrical filter in each arm may have different characteristics, for example they may be narrow bandpass filters with different central frequencies. Again, in this case the tap time delay may include the option of Δτ=0. FIG. 18 adopts the features of FIGS. 15 to 17 into a single architecture, with both optical and electrical processing being possible in each arm. Again, the time delay could be imposed in either the optical or electrical domain. The optical filters in FIGS. 16 and/or 18 could be narrowband optical filters with different central frequencies.

In still further embodiments a polarizing element may be placed in one or both arms of the optical delay line.

Figure 19:
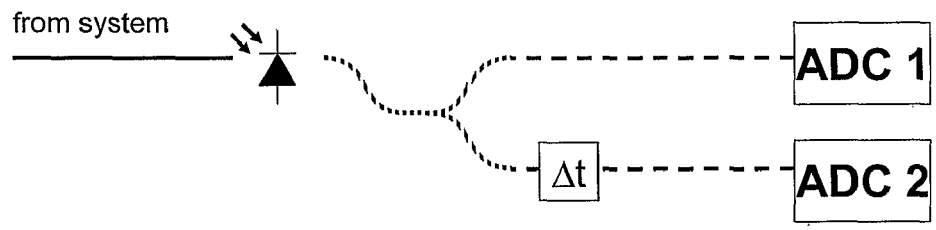
FIG. 19 illustrates still another embodiment of a two tap asynchronous sampling optical signal monitor in accordance with the present invention.
Figure 20:
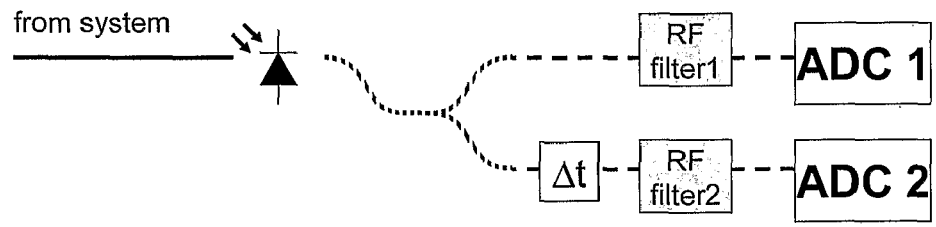
FIG. 20 illustrates another embodiment of a two tap asynchronous sampling optical signal monitor in accordance with the present invention.

FIG. 19 illustrates yet another architecture in which only a single photodetector is required, with splitting occurring in the electrical domain and the time delay being imposed in on arm of the split electrical line. FIG. 20 is a schematic of an architecture which expands on that of FIG. 19 by including RF filters in the electrical domain before digitisation.

Figure 21:
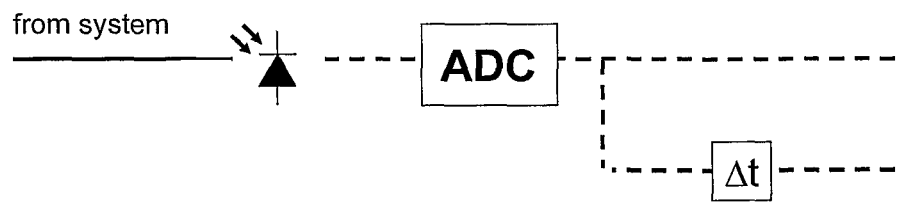
FIG. 21 illustrates a further embodiment of a two tap asynchronous sampling optical signal monitor in accordance with the present invention.
Figure 22:
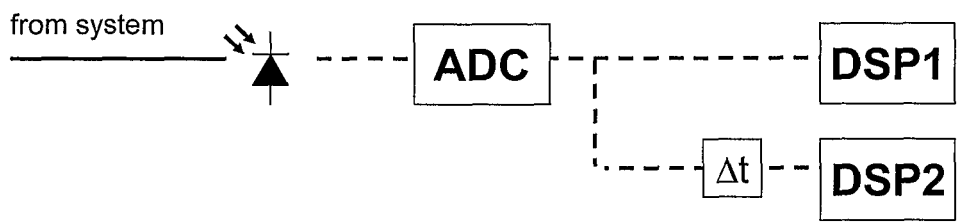
FIG. 22 illustrates another embodiment of a two tap asynchronous sampling optical signal monitor in accordance with the present invention.

FIG. 21 shows yet another embodiment in which only a single photodetector is required, and further, only a single ADC is required. The digital output of the ADC is then split into two lines, one of which is subjected to a time delay, which is implemented by a sampling offset in the digital signal. FIG. 22 shows an architecture which expands on FIG. 22 by providing for digital signal processing of one or both digital streams.

Figure 23:
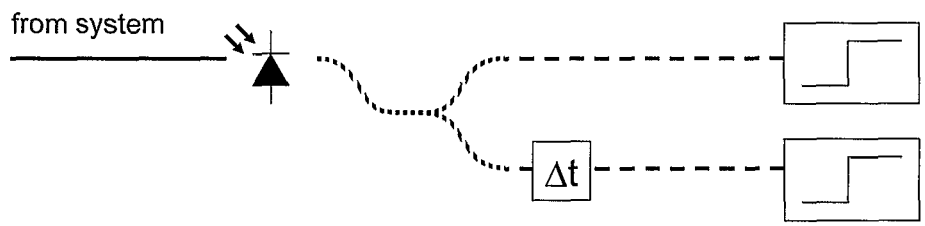
FIG. 23 illustrates yet another embodiment of a two tap asynchronous sampling optical signal monitor in accordance with the present invention.
Figure 24:
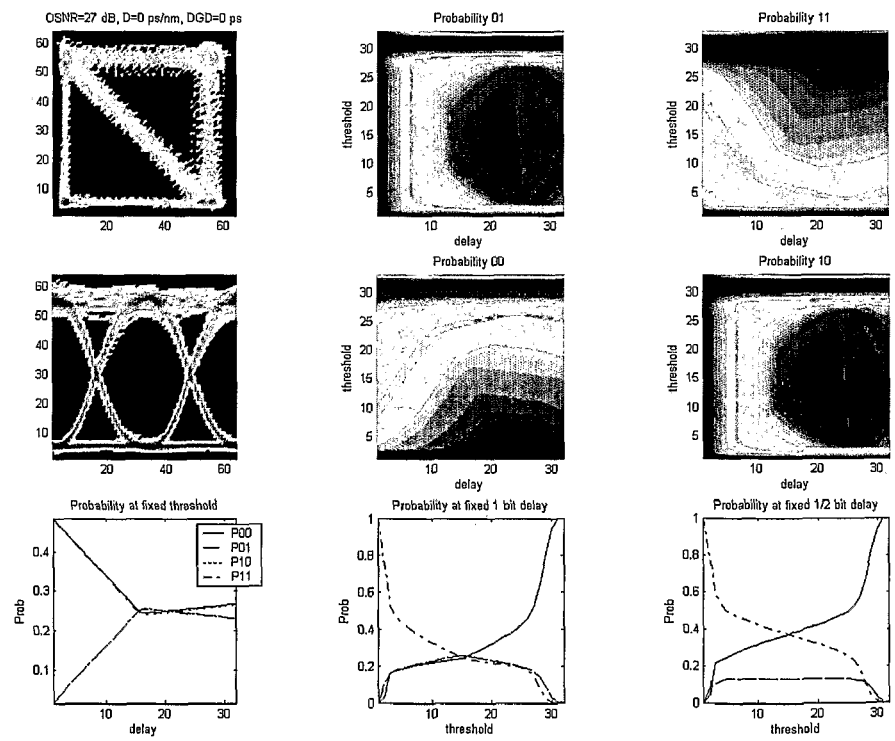
FIG. 24 illustrates the effect of varying the decision threshold in the circuit of FIG. 23 without degradation.
Figure 25:
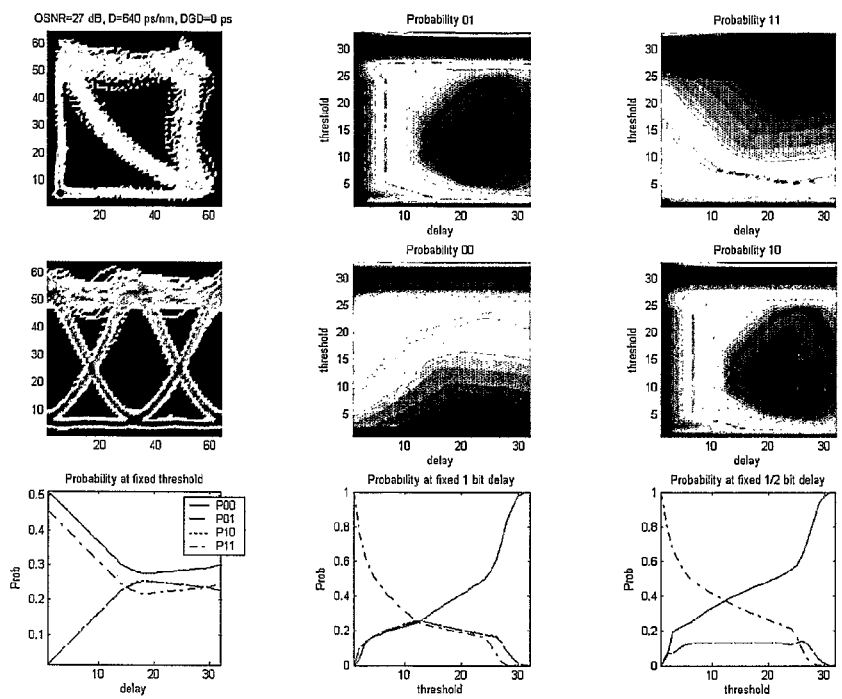
FIG. 25 illustrates the effect of varying the decision threshold in the circuit of FIG. 23 with degradation.

FIG. 23 shows another variation on FIGS. 21 and 22 in which the ADC(s) is/are not used and instead thresholding is applied to obtain each sample. In such a circuit what is observed is the relative probabilities of detecting sample sets of (0,0), (0,1), (1,0) or (1,0). It is preferable to measure these probabilities for different threshold levels and/or different time delays Δτ. FIGS. 24 and 25 illustrate the effect of varying the decision threshold in the circuit of FIG. 23, when sampling an optical signal suffering from no degradation (FIG. 24), or when sampling an optical signal suffering from dispersion of 640 ps/nm (FIG. 25). FIG. 24a shows the corresponding two tap asynchronous scatter plots and FIG. 24d shows the corresponding synchronous eye diagram. FIGS. 24b, c, e and f show the probability of measuring samples pairs (0,0), (1,0), (0,1) and (1,1), respectively.

A further example of the invention will now be described with reference to FIGS. 40-42. The implementation of practical all-optical networking requires cost-effective, yet flexible monitoring, to enable proper management of complex DWDM systems that can carry multiple modulation formats on the same fiber. Amplitude Shift Keyed (ASK) formats such as Non Return to Zero (NRZ) and Return to Zero (RZ) are already ubiquitous in current DWDM systems, and phase modulated formats such as Differential Phase Shift Keyed (DPSK) will become more common as line-rates increase from 10 Gbit/s to 40 Gbit/s, due to their increased robustness. Ideally, optical monitoring should be able to cope with all these formats. To further complicate requirements, monitoring may also be needed at various points in the network where chromatic dispersion is unlikely to be equalised, e.g. at Reconfigurable Optical Add Drop Multiplexers (ROADM's), hindering clock extraction.

For detection of DPSK modulation, narrowband optical filtering is proposed as an alternative to interferometric receivers. Fortunately, this filtering also provides a route to cost-effective monitoring of multiple modulation formats throughout the network. The optical filter used for DPSK requires a bandwidth approximately equal to the bit-rate in Hz, e.g. 10 Gbit/s requires a 3 dB bandwidth of 10 GHz. However, ASK signals at the same data rate have a broader spectral content, and so will be distorted by the filtering.

In this embodiment narrowband filtering is combined with the asynchronous delay-tap technique, to provide a flexible, clock-free monitor that can work with multiple modulation formats. To assess the narrowband filter approach of FIGS. 40-42 we experimentally compare the monitor signals for NRZ, RZ, and NRZ-DPSK formats at 10 Gbit/s, with different levels of chromatic dispersion. This comparison can also be scaled to 40 Gbit/s via use of a suitable filter.

Figure 40:
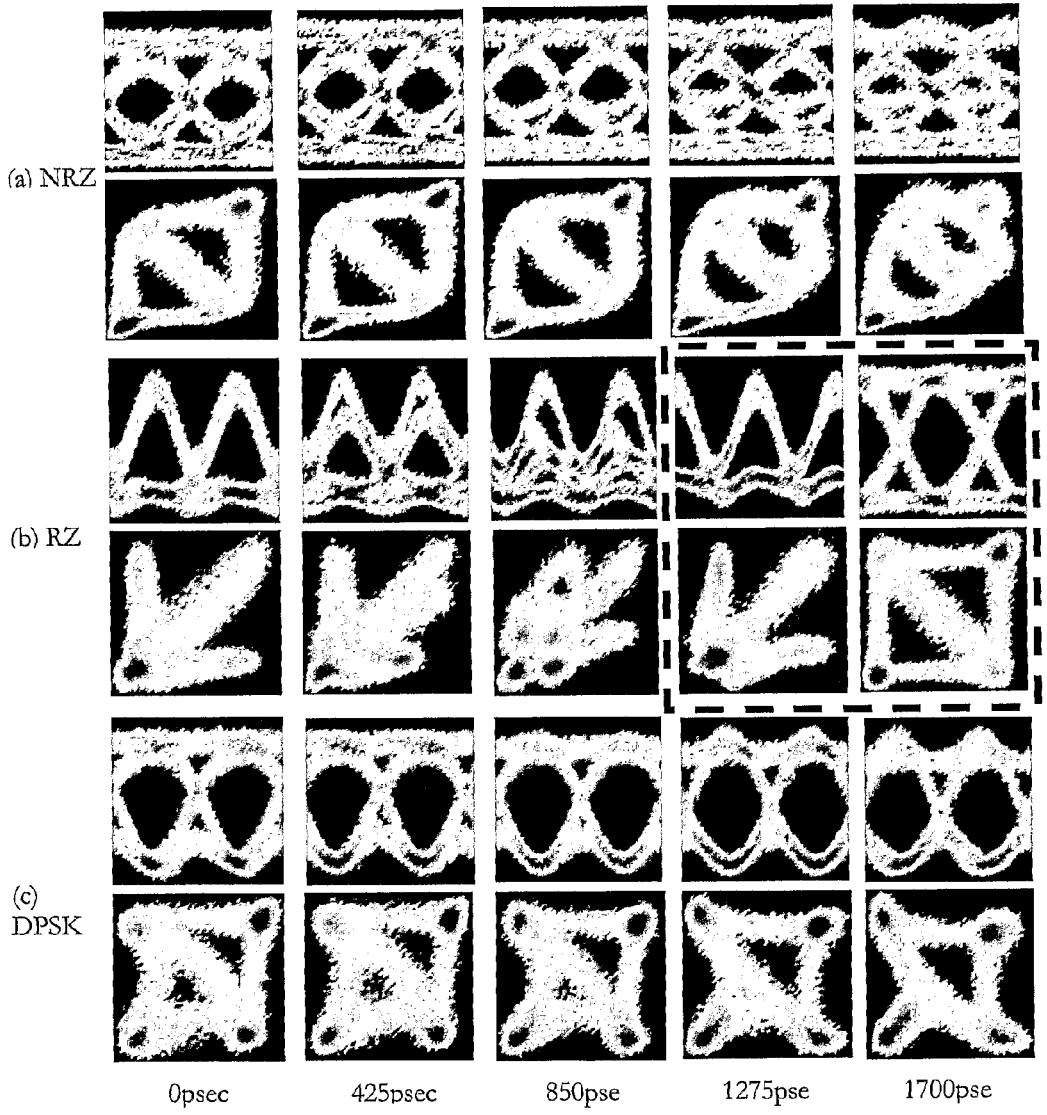
FIGS. 40-42 illustrate application of a further embodiment of the present invention to RZ, NRZ and NRZ-DPSK formats in diagnosing chromatic dispersion.
Figure 41:
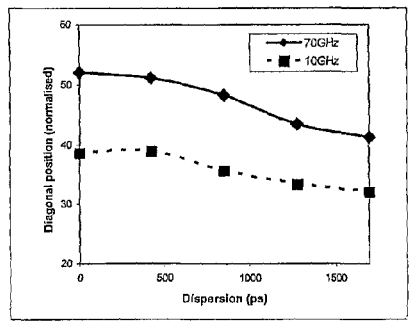
Figure 42:
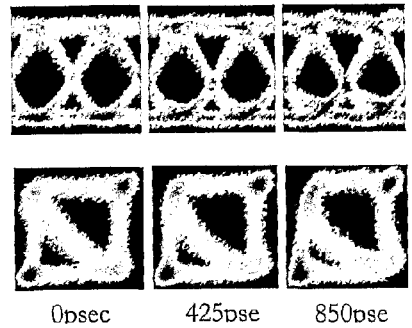

For modulation format generation for the embodiment of FIGS. 40-42 a single 10 Gbit/s channel was used for the comparison, using a PRBS of $2^{23}-1$. NRZ and 50% duty-cycle RZ were generated by a pair of appropriately biased MZ modulators. NRZ-DPSK was produced from a separate intensity-modulated MZ modulator biased to give the required $\pi$ phase-shift between transitions. Producing DPSK in this manner avoids the problems of chirp generation that occurs in phase modulators when driving conditions are sub-optimal. The modulated channel was then passed through various lengths of single mode fiber to add chromatic dispersion. The overall loss was kept constant by an optical attenuator. All three formats were monitored with the same receiver arrangement, consisting of a Fabry-Perot optical filter with a 3 dB bandwidth of 10 GHz, and an electrically amplified pin photodiode with a bandwidth of 15 GHz. A 3 dB RF power splitter and delay line were used to provide two electrical signals with a 1 bit (100 ps) delay to a digital communications analyzer, which either sampled one signal synchronously to produce standard eye diagrams or both signals asynchronously to produce two dimensional "phase portraits".

The modulation format comparison is illustrated in FIG. 40, which shows both the eye diagrams and the corresponding phase portraits, as the dispersion was increased from 0 km to 100 km of single mode fiber, in 25 km steps. Beyond 50 km, RZ is of less interest as the degradation is extreme. Instead, we show for comparison an inset of RZ and NRZ through a much broader 70 GHz optical filter with no dispersion.

Implications for monitoring: the phase portraits of FIGS. 40-42 show distinct differences between the three modulation formats, highlighting the potential for modulation format recognition. Within each format, the portraits also show characteristic, but differing, changes with increasing dispersion. For example, the NRZ diagonal curvature has been shown in the preceding, with reference to FIGS. 8 and 9 for example, to have a direct measure of chromatic dispersion. FIG. 41 shows that this relationship still holds with the narrowband filter centred at 10 GHz as well as a wideband optical 70 GHz demux filter, although the response has a smaller range. Similarly, the RZ phase portrait shows splitting in the bottom left corner that eventually forms into a box shape as has also been noted for a broad optical bandwidth. The power of the delay-tap technique is particularly evident in the NRZ-DPSK plots. As dispersion increases the slope changes in the crossovers of the standard eye diagram are much harder to detect than the signatures evident in the NRZ-DPSK phase portraits, particularly the reversed curvature of the diagonal, and disappearance of the bottom and left sides of the phase portraits.

We note that using narrowband filters instead of delay interferometer DPSK receivers produces different performance, however this is not a significant issue for monitoring purposes. As seen in FIG. 40c, the NRZ-DPSK eye with narrowband filtering initially improves with increasing dispersion before it begins to degrade; an effect which has been used to extend the reach of DPSK transmission. Conversely, DPSK with interferometric receivers and broader optical filters is continuously degraded with increasing dispersion, as seen in FIG. 42. However, the differences in the phase portraits in FIG. 40c show that this effect can be accounted for with prior calibration.

The results presented in FIGS. 40-42 have been measured at 10 Gbit/s. However, the same trends will apply at 40 Gbit/s, but with stronger dispersion limits. We also note that for the corresponding 40 GHz filter, ASK signals of any format or bit-rate up to, and including, 40 Gbit/s will pass through the filter sufficiently unaffected for them to be effectively monitored using the technique. The complexity but robustness of DPSK makes it a more likely candidate for 40 Gbit/s deployment, so we conclude that the monitor above provides a practical single means of monitoring the likely modulation formats at 10 and 40 Gbit/s.

The example of FIGS. 40-42 demonstrates the effectiveness of using a combination of an asynchronous delay-tap sampling method with a narrowband filter of width approximately equal to the bit-rate to monitor not only DPSK signals, but also the same data rates for ASK formats such as RZ and NRZ. This will be important in future all-optical networks to allow the management of fibers containing WDM channels having a variety of modulation formats and bit-rates.

Figure 43:
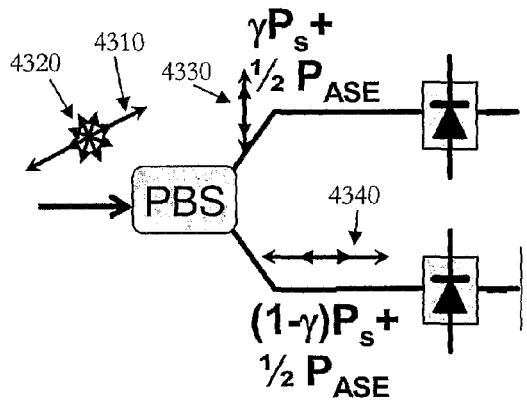
FIG. 43 illustrates an architecture for OSNR analysis in accordance with a further embodiment of the invention.

An OSNR analysis process in accordance with a further embodiment of the invention will now be described with reference to FIGS. 43 to 47. FIG. 43 illustrates the hardware configuration 4300. An input signal 4310 having power $P_s$ is polarised at a random unknown angle θ and is accompanied by amplified spontaneous noise (ASE) of power $P_{ASE}$ which is unpolarised as illustrated by the multidirectional arrows 4320. No input polarization controller is utilised before the input signal 4310 is passed through polarisation beam splitter (PBS) and split into two arms. The first arm carries signal 4330 which carries a portion $\gamma P_s$ of the signal of interest and also carries half of the ASE signal power. The second arm carries signal 4340 which comprises a portion $(1-\gamma)P_s$ of the signal of interest and also carries half of the ASE signal power.

The signals 4330 and 4340 in the two arms are then detected independently and converted to the electrical domain by suitable photodetectors. At this point this architecture bears some resemblance to the disclosure of International Patent Application No. PCT/AU2006/000560, the contents of which are incorporated herein by reference. However, in the present embodiment the outputs of the two photodetectors are sampled directly in accordance with the present invention in order to obtain sample sets over time (with no time delay imposed between samples). Gain compensation and electrical domain subtraction of the signals are thus not applied in this embodiment.

Figure 44:
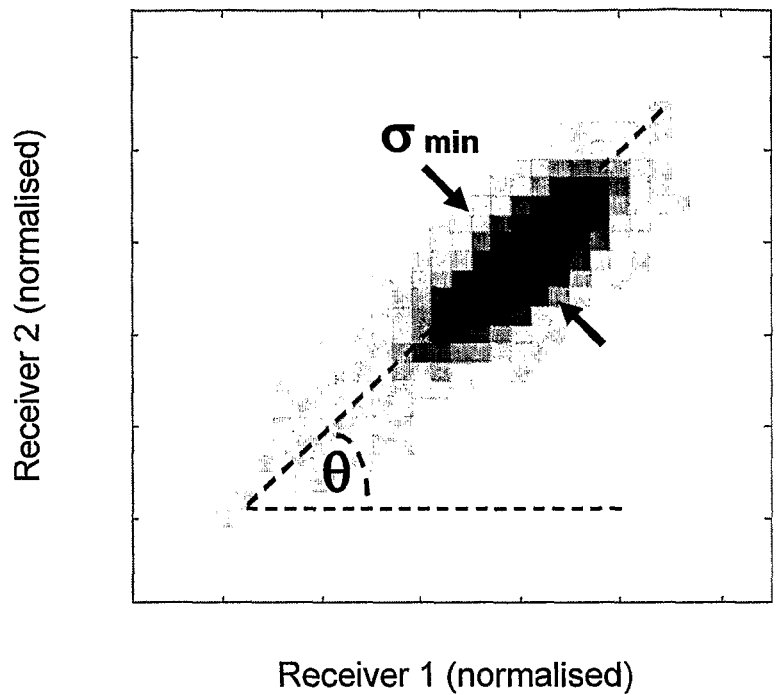
FIGS. 44-47 illustrate the output of the architecture of FIG. 43 and the OSNR analysis technique.

The joint probability distribution of the sample sets obtained from the two detector outputs is then analysed. The normalised plot of an example joint probability distribution shown in FIG. 44 gives the critical features of this embodiment. The major axis of the joint probability distribution of FIG. 44 corresponds to variations in received power due to data modulation. These amplitude variations persist, even when using a much slower bandwidth than the data rate. The major axis is defined by the angle θ that it makes with the x axis (receiver 1), and corresponds to the relative alignment of the signal 4310 with the polarization beam splitter (PBS) axes. The direction of the major axis is determined.

Then the standard deviation of the minor axis (orthogonal to the major axis) $\sigma_{min}$, is calculated. This is a direct measure of the noise in the system. For example, if there is little or no noise, then the plot is a thin line and $\sigma_{min}$ is small, as illustrated in FIG. 47. If the noise is high, then the line will be thicker, as illustrated in FIG. 46.

$\sigma_{min}$ contains contributions from signal-spontaneous beat noise, and spontaneous-spontaneous beat noise from the optical amplifiers, depending on the angle θ. There is also an underlying thermal noise floor which determines the sensitivity. See plot of FIG. 45, which illustrates $\sigma_{min}$ on a log scale (which corresponds to noise floor in dBm) against the angle θ, for OSNR between a poor level of 8 dB (topmost results) through to a good OSNR level of 29 dB (lowest results). Differences in the two receiver arms cause asymmetry as shown in the plot, however such asymmetry is removable by calibration. The floor is a maximum at 45° as this contains the most signal-spontaneous beat noise. At angles of 0 and 90°, there is no signal in one arm or the other, so the width $\sigma_{min}$ of the probability density function is purely spontaneous-spontaneous noise and thermal receiver noise.

Figure 45:
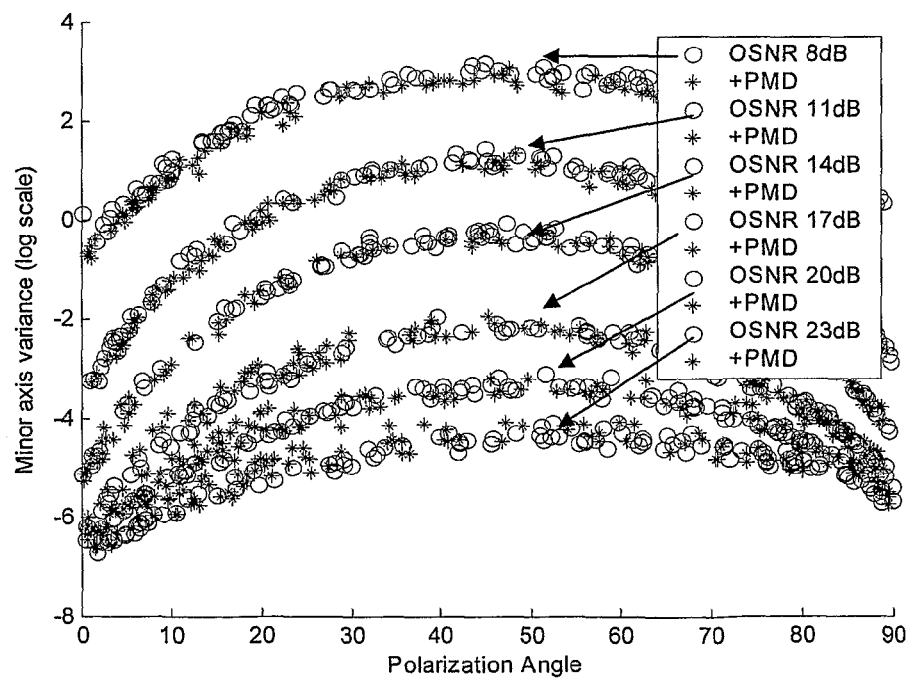

The linear offset of curves for different OSNRs shows clearly that the combination of angle θ and minor axis variance (or standard deviation) $\sigma_{min}$ gives a unique determination of the noise floor position, which is what is required to measure the OSNR. At the edges (0 and 90°) of the plot of FIG. 45, the results become indistinguishable for OSNRs of 20 dB and above. This is due to the thermal noise floor of the electronics used for this example and does not represent a fundamental limit. FIG. 45 includes data with and without PMD of 30 ps, and shows that the OSNR measurement technique is not affected by PMD.

Figure 46:
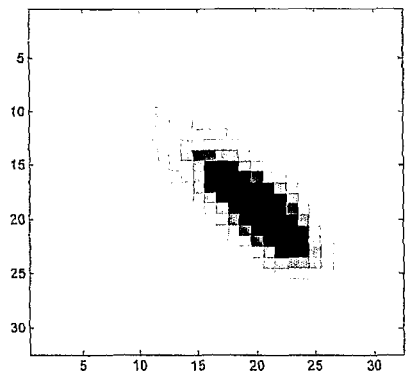
Figure 47:
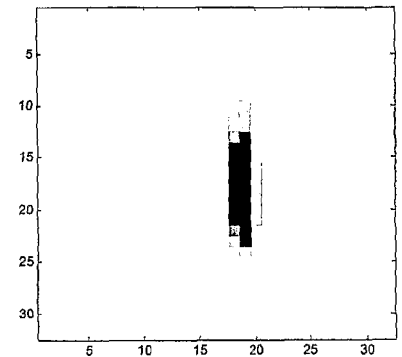

To further illustrate this embodiment, FIG. 46 is a 2 dimensional histogram or probability density function provided to illustrate a specific case obtained from a signal of low OSNR and input polarisation rotation angle of around 45 degrees. Similarly, FIG. 47 is a 2 dimensional histogram or probability density function provided to illustrate a specific case of high OSNR and input polarisation rotation angle of around 0 degrees.

Other embodiments similar to that shown in FIG. 43 may be provided in accordance with the present invention. For example, the receivers may include a measurement of the received optical power, or the receivers may be AC or DC coupled. If the signal to be analysed is not amplitude modulated, but modulated using phase or other means, then the above analysis needs to be modified slightly, but the essential features remain. The major axis will no longer be defined by data modulation, but will be defined by the arm with the larger received power. Analysis of the standard deviations of the major and minor axes will give the OSNR. Alternatively, phase to amplitude noise in these systems usually results in some amplitude ripple, and this would form the major axis. Under these circumstances, the minor axis analysis proposed above will work.

Figure 48:
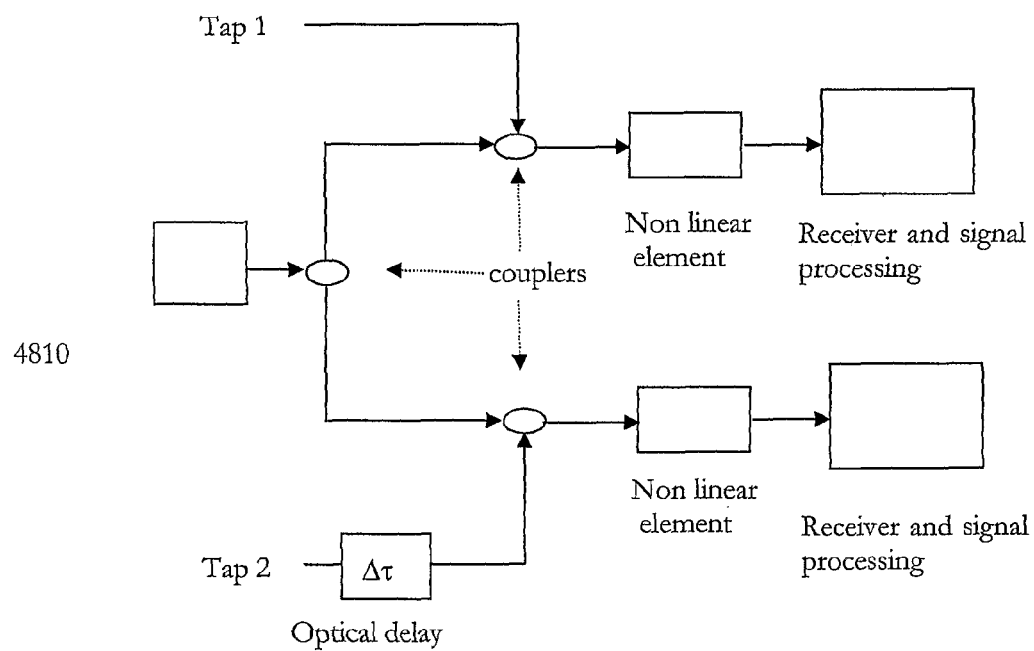
FIG. 48 illustrates an embodiment of the invention utilising optical sampling.

Yet another embodiment of the invention is illustrated in FIG. 48, involving two tap asynchronous monitoring implemented with all optical sampling. This embodiment recognises that for very high speed optical systems (>100 Gb/s) it may be difficult to cost effectively achieve the required temporal resolution (<1 ps) by sampling in the electrical domain, and that a more practicable alternative is to optically sample the waveform. In this technique short optical sampling pulses from a sampling pulse source 4810 are mixed with the signal and injected into a non linear optical AND gate. The output can be analyzed with a low speed receiver and electronics (<1 GHz). The fast optical AND gate could for example be a $2^{nd}$ order non linear crystal. The source of the pulses could for example be a gain switched laser diode or mode locked laser. In this case the time delay is in the optical domain.

Figure 26A:
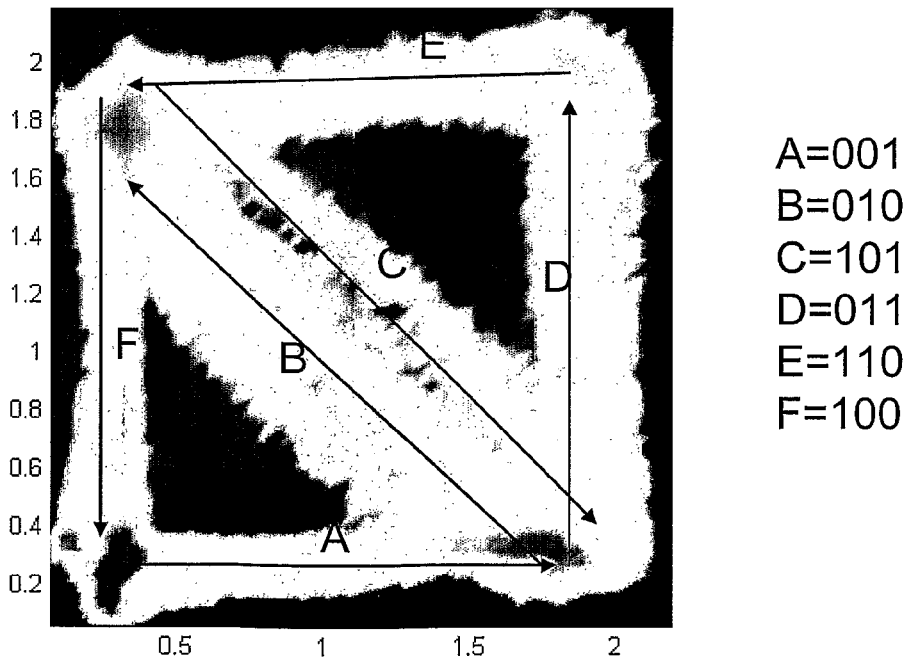
FIGS. 26a and 26b illustrate the manner in which an approximation of a 'synchronous' eye diagram may be generated from an asynchronously obtained scatter plot or two dimensional histogram.

FIG. 26a illustrates the manner in which an approximation of a 'synchronous' eye diagram may be generated from the asynchronously obtained scatter plot of FIG. 26a. The position of each point on the scatter plot depends on the bit sequence of the sampled signal. Thus, each 'transition' in the scatter plot (the diagonal, vertical and horizontal 'lines' of points) is made up only of points which have been sampled from the signal when that particular bit sequence has occurred. As indicated in FIG. 26a, these transitions are A=001, B=010, C=101, D=011, E=110 and F=100. It is noted that the other two possible bit sequences of 000 or 111 contribute only to the top right or bottom left corners of the plot, and not to any of the indicated 'transitions'. It is also noted that transitions B and C are substantially co-located on the central diagonal.

When considering the scatter plot of FIG. 26a in this way, an approximation of a synchronous eye diagram can be generated, by noting that the density of points along each transition conveys timing information. Provided that the sample sets plotted in FIG. 26a have been obtained uniformly throughout the bit period (i.e without a concentration of samples at a centre of the bit period, for example), the slope of the corresponding transition on the eye diagram can be determined by taking the inverse of the density of points on that transition in the asynchronous histogram of FIG. 26a. For example, it can be seen that there are relatively few points near the centre of transition F, such that the slope of the corresponding transition in an eye diagram will be relatively steep. Such a 'synchronous' eye diagram can thus be generated or approximated despite the fact that the sample sets plotted in FIG. 26a were obtained asynchronously relative to the data rate, without need for retrieval of a data clock.

Figure 26B:
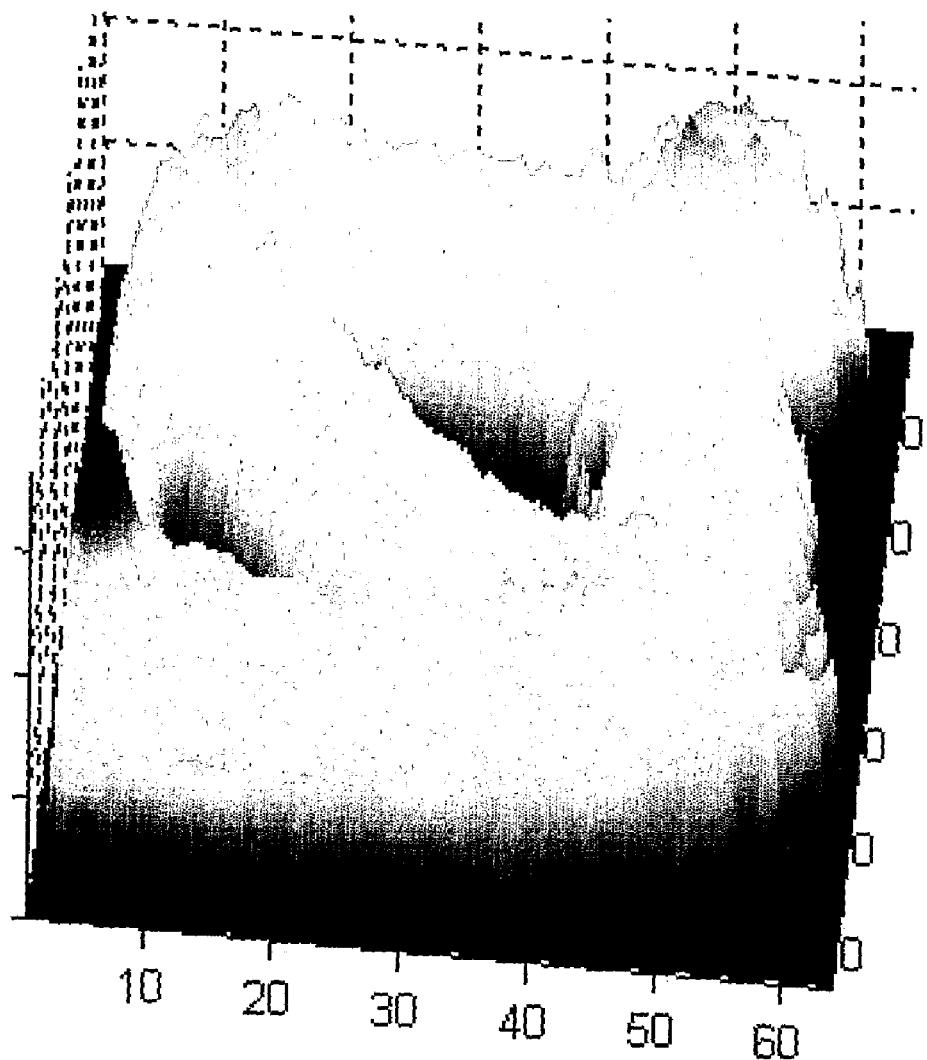

FIG. 26b is a two dimensional histogram in which the x and y axes represent the sample set values, and the z axis represents the sample density obtained in each sub-area of the phase portrait.

Figure 27:
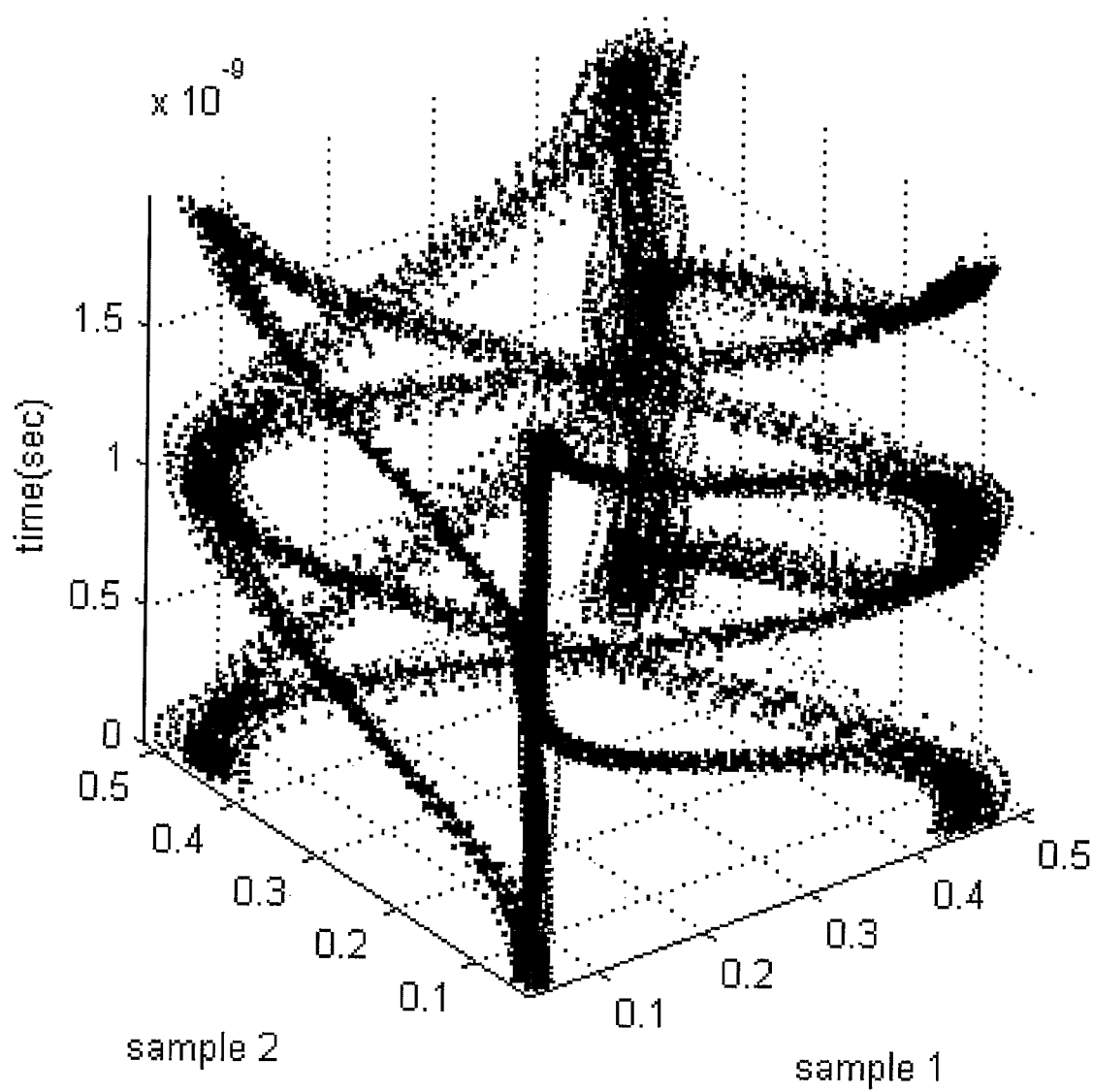
FIG. 27 is a plot of two-sample sample sets, with the third dimension arising by plotting the sampling time of each sample set against the third (vertical) axis.

FIG. 27 is a plot of two-sample sample sets, with the third dimension arising by plotting the sampling time of each sample set against the third (vertical) axis. The three dimensional distribution shown in FIG. 27 collapses back to a conventional eye diagram if either sample 1 or sample 2 is plotted against time. Similarly, the three dimensional distribution collapses back to a two dimensional distribution similar to the plots of FIG. 14, for example, if sample 1 is plotted against sample 2 without plotting time.

Figure 28:
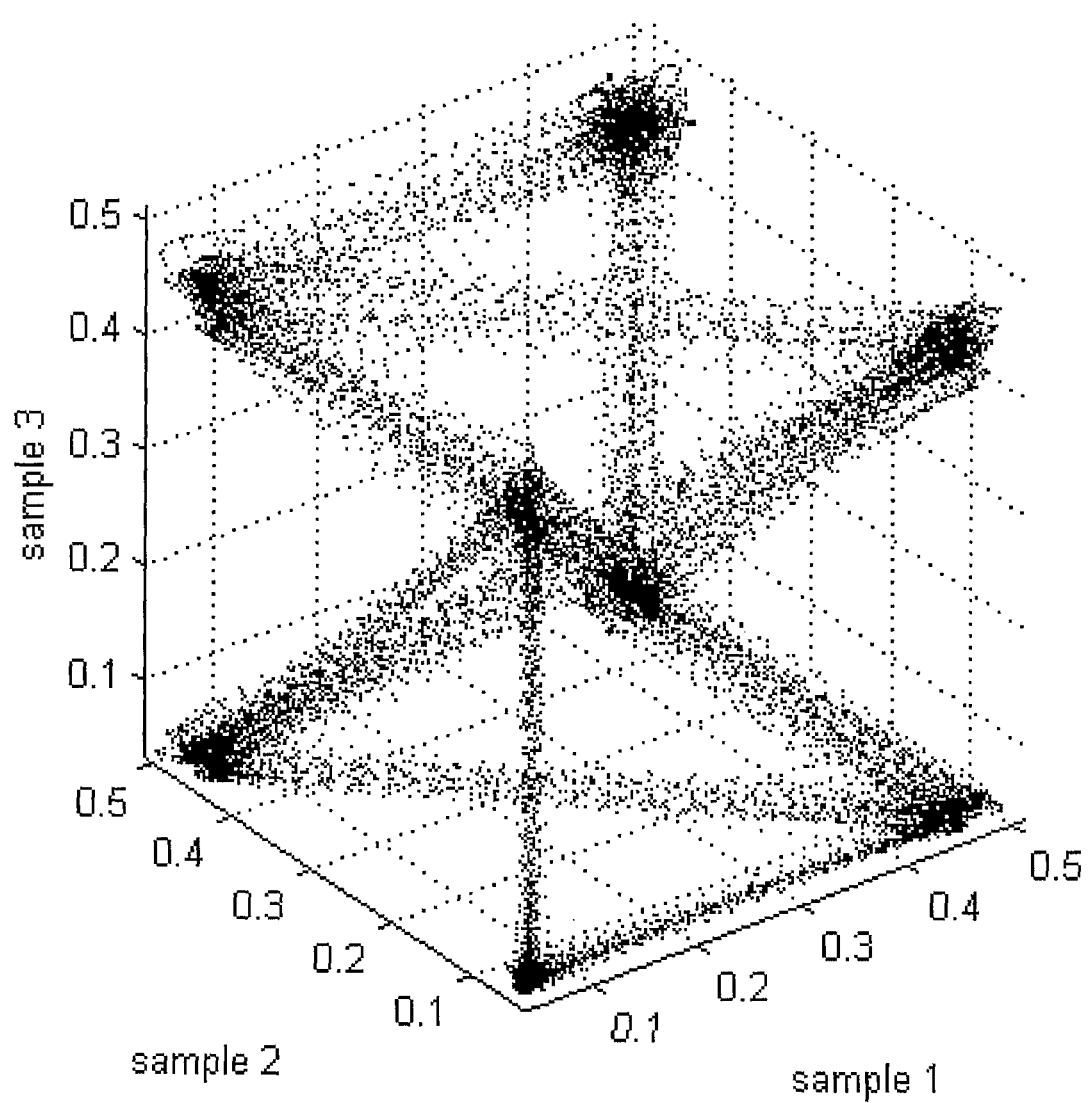
FIG. 28 is a three dimensional scatter plot of sample sets obtained asynchronously from an impairment free optical signal, each sample set being derived from three tap points.

While FIGS. 15 to 27 relate to two tap points, it is further to be appreciated that these or other combinations of features may be implemented in still further embodiments utilising three or more tap points. FIG. 28 is a three dimensional scatter plot of sample sets obtained asynchronously from an impairment free optical signal, each sample set being derived from three tap points. A time delay of 1 bit is imposed between the first and second sample tap points, and between the second and third tap points. As is the case for the two dimensional scatter plots in other Figures, it is noted that certain 'transitions' are not possible and thus no points appear on such transitions. For example, it is not possible for a point to exist on the transition from (1,1,1) to (0,0,0), among other impossible transitions.

The preceding figures illustrate the capability and versatility of such scatter plots or constellation diagrams to isolate features which have the potential to enable diagnostic differentiation between impairments. For example the curvature evident in the lines representing the 010 and 101 transitions is strongly related to chromatic dispersion.

The present invention further recognises that machine learning may be applied to assist in such diagnosis of signal impairment type and/or severity. Thus, in an alternative implementation the outputs from the delay tap asynchronous monitor may be used as inputs into a signal processing module that automatically identifies and quantifies the source of impairments contributing to the signal waveform. The processing module may be based on supervised learning techniques. These techniques include but are not limited to:
  regression,
  ridge regression,
  support vector regression.

Any of these techniques can be used with a linear kernel $$k(x, x') = x \cdot x' = \sum_{i=1}^{d} x_i x'_i$$

or a non-linear kernel, such as a polynomial kernel of degree p:

$$k(x,x')=(x \cdot x'+1)^p$$

for $x=(x_i)$, $x'=(x'_i) \epsilon R^d$. Other supervised learning techniques could be used here as well. The training sets for supervised learning may be created from simulations, experimental measurements or a combination of both. In the preferred embodiment described here, the output from the asynchronous monitor, whether obtained by two or more sample taps, is processed into a two or more dimensional histogram prior to training, such as the two dimensional histogram illustrated in FIG. 26b. For example, the volume occupied by the sample points illustrated in FIG. 28 or 27 may be divided into many sub-volumes, which allows creation of a three dimensional histogram which represents the number of sample points falling within each sub-volume.

Figure 29:
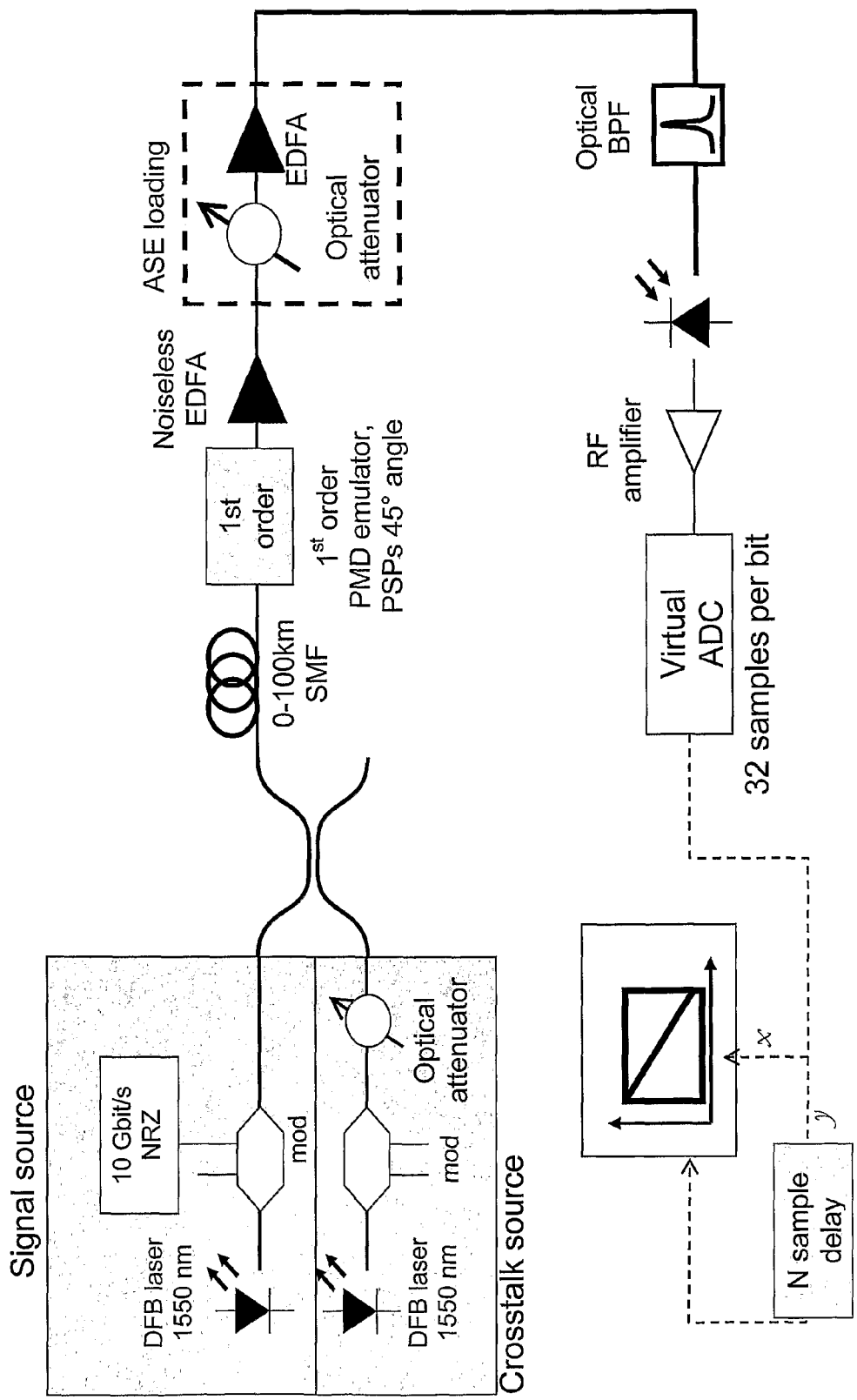
FIG. 29 is a simulation of typical impairments in an optical network.

As an example training sets for a two tap asynchronous monitor with linear kernel have been generated by simulating a typical optical network, as shown in FIG. 29, with a variety of simultaneous impairments. The impairments modeled (ranges) were:
  OSNR (15-27 dB)
  Dispersion (0-1600 ps/nm)
  Modulator Chirp (−1.5 to 1.5)
  Filter Detuning (−20 to +20 GHz)
  PMD (0-50 ps)

Sets of asynchronous samples with a tap delay of 1 bit period were created for 7000 randomly generated combinations of impairments. These sample sets were then used as input and validation for a model based on Ridge regression.

Figure 30:
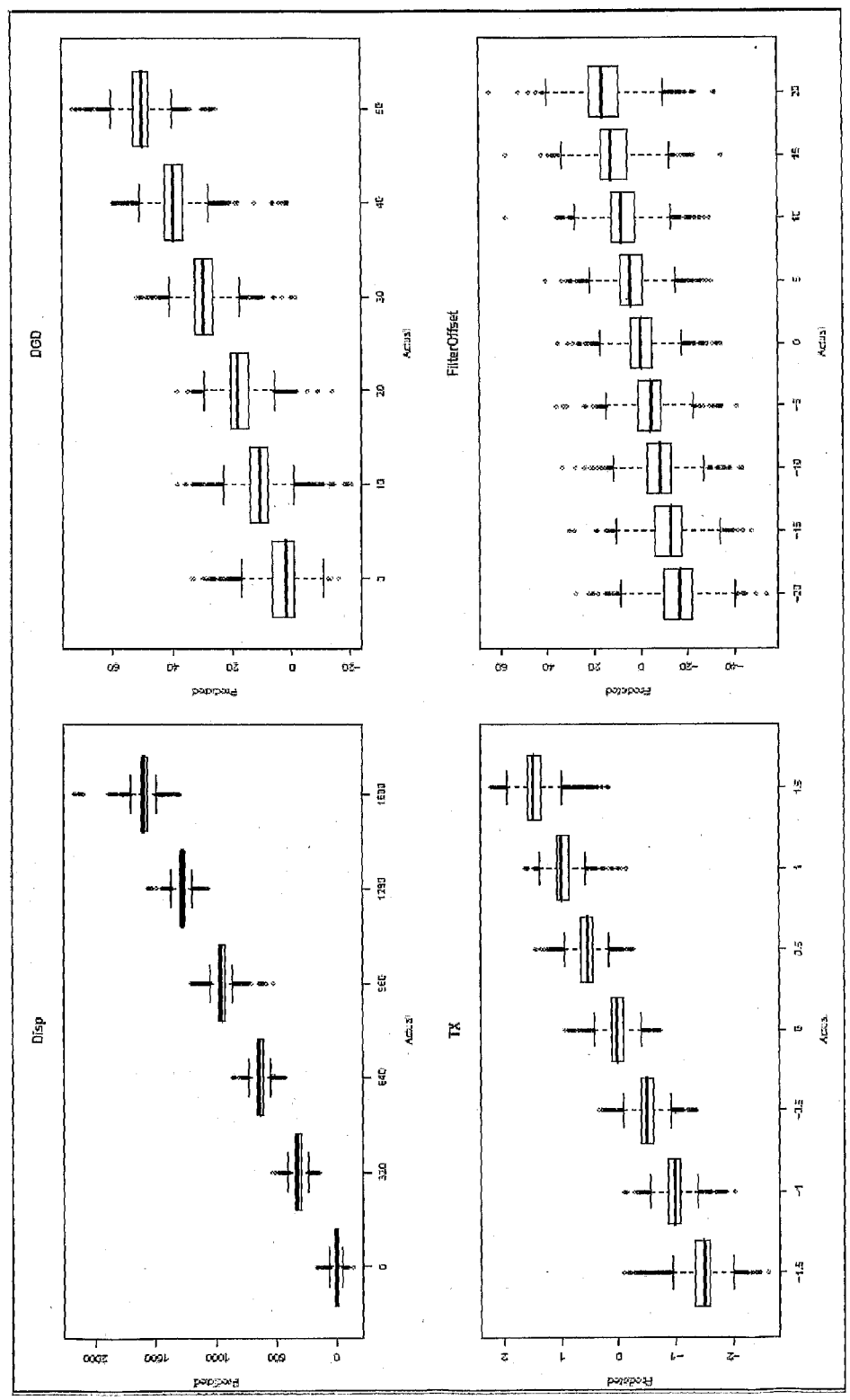
FIG. 30 illustrates results of using a machine learning algorithm using ridge regression and a linear kernel to predict impairment combinations produced by the simulation of FIG. 29.

Results are shown in FIG. 30. The graphs show the predicted values (y-axis) versus the "true" value (x-axis) for Dispersion, Chirp (TX), Filter offset and PMD (DGD), for the link suffering five simultaneous impairments, with no significant level of OSNR being present. Selected predictions for particular values for all five impairment types are shown in Table 1 below, in the format (true value)/(prediction):

TABLE 1

| Disp (ps/nm) | PMD (ps) | Tx chirp | Freq off (GHz) |
|---|---|---|---|
| 0/39 | 0/20 | +1.5/+0.6 | 0/−1 |
| 640/490 | 20/20 | −1.5/−1.0 | −5/4 |
| 1280/1270 | 10/16 | −0.5/−1.0 | 20/5 |
| 1280/1250 | 30/24 | 0/+0.1 | 10/8 |
| 640/530 | 30/26 | 1.5/1.4 | −20/−17 |
| 640/625 | 10/11 | 1.5/0.6 | −10/−13 |
| 320/460 | 20/30 | 1.5/0.6 | 0/−6 |
| 1600/1570 | 20/17 | 0.5/0.51 | −15/−9 |
| 1280/1330 | 50/50 | −1.5/−1 | 10/9 |
| 320/200 | 10/15 | 0/0 | 10/1 |

Figure 31:
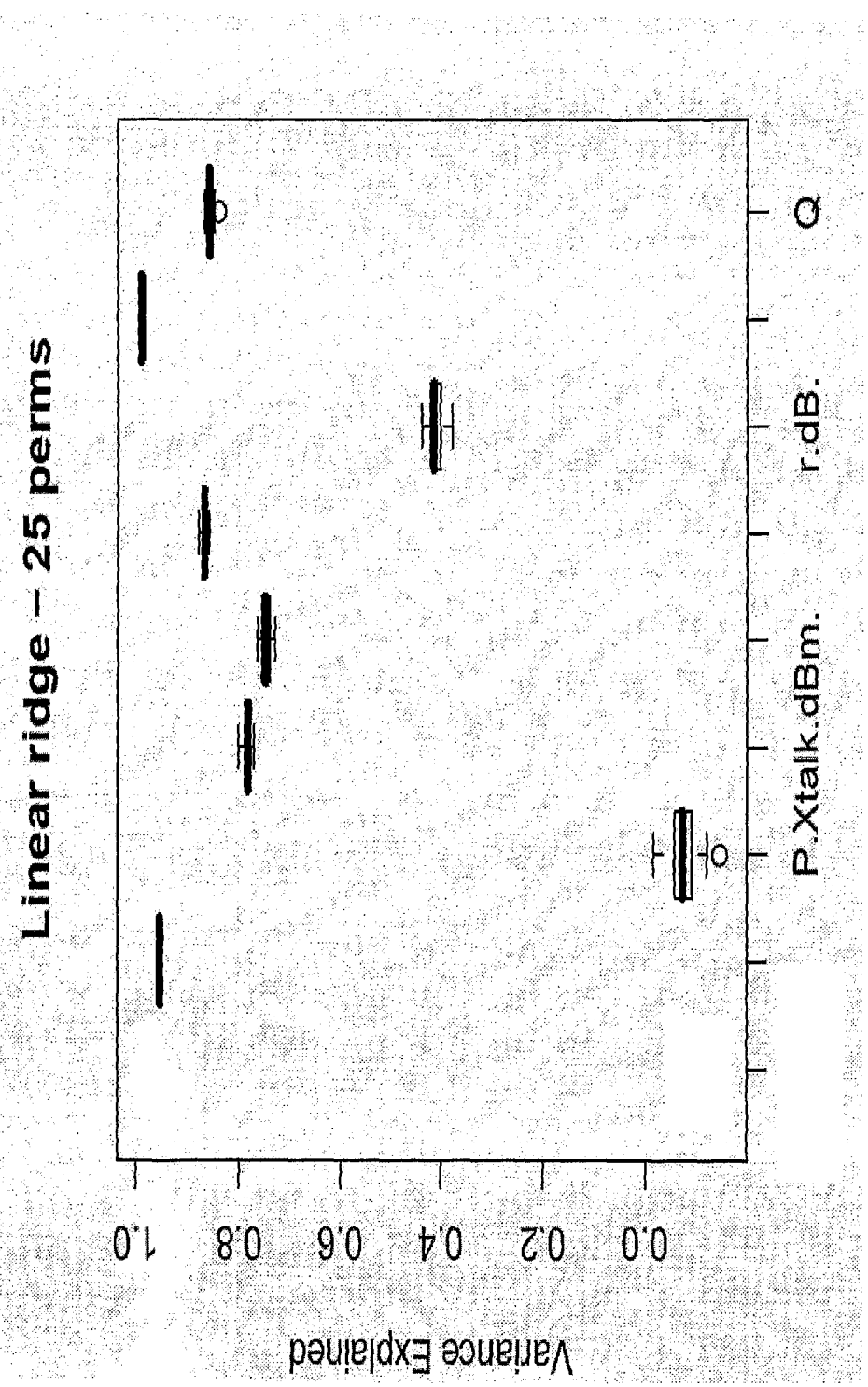
FIG. 31 illustrates the prediction accuracy of a linear kernel using the outputs of two sample taps at delay 1 bit period.

FIG. 31 illustrates the prediction accuracy of a linear kernel using the outputs of two taps at delay 1 bit period and asynchronously sampled, by plotting Variance Explained for each impairment. From left to right Variance Explained values are provided for OSNR (dB), dispersion (ps/nm), optical power (dBm), crosstalk (dBm), PMD (ps), Df (GHz), r (dB), jitter period and Q. Prediction accuracy can be seen to be relatively high for dispersion (ps/nm), crosstalk (dBm), PMD (ps), Df (GHz), Jitter period and Q, and somewhat accurate for r (dB). Prediction accuracy is poor for OSNR and optical power when using a linear kernel, however it is noted that there is relatively little need for optical power prediction as standard optical power meters suffice.

Figure 32:
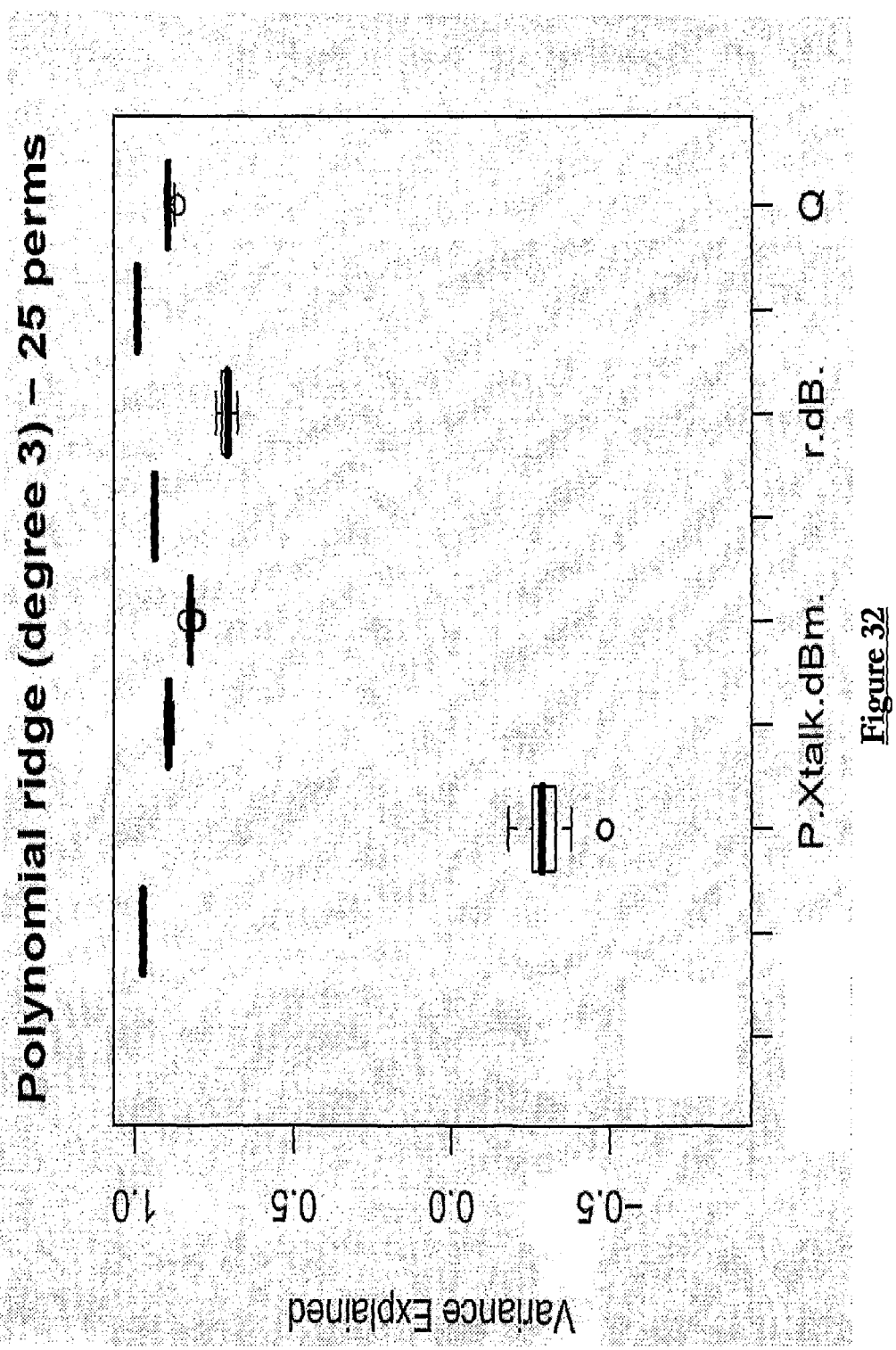
FIG. 32 illustrates the prediction accuracy of a non-linear kernel with polynomial kernel of degree 3 using the outputs of two sample taps at delay 1 bit period.

FIG. 32 illustrates the prediction accuracy of a non-linear kernel with polynomial kernel of degree 3 using the outputs of two taps at delay 1 bit period and asynchronously sampled, by plotting Variance Explained for each impairment. From left to right Variance Explained values are provided for OSNR (dB), dispersion (ps/nm), optical power (dBm), crosstalk (dBm), PMD (ps), Df (GHz), r (dB), jitter period and Q. Relative to FIG. 31, prediction accuracy can be seen to have improved for r (dB), but deteriorated for OSNR when using such a non-linear kernel.

Figure 33:
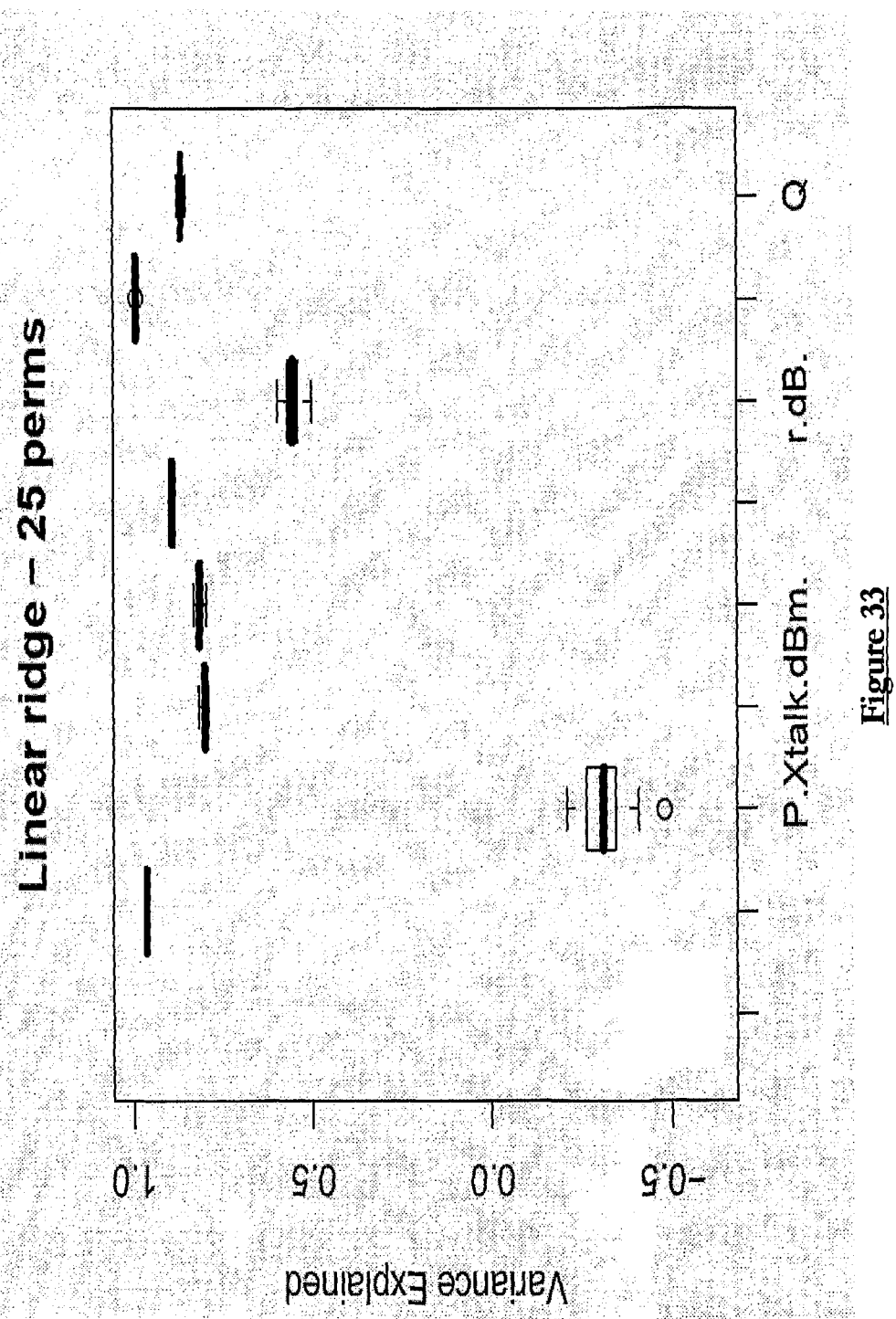
FIG. 33 illustrates the prediction accuracy of the linear kernel using the outputs of five sample taps at delays 1, ½, ¼, and ⅛ bit periods relative to the leading tap, respectively.

Next a multi tap (5 tap) asynchronous monitor with a machine learning algorithm was tested. In this experiment we used multiple taps at delays 1, ½, ¼, and ⅛ bit periods relative to the leading tap, respectively. First a linear kernel was applied to the obtained samples, with results shown in FIG. 33. From left to right Variance Explained values are provided for OSNR (dB), dispersion (ps/nm), optical power (dBm), crosstalk (dBm), PMD (ps), Df (GHz), r (dB), jitter period and Q. Prediction accuracy can be seen to be relatively high for dispersion (ps/nm), crosstalk (dBm), PMD (ps), Df (GHz), Jitter period and Q, and somewhat accurate for r (dB). Prediction accuracy is poor for OSNR and optical power when using such a linear kernel with 5 taps.

Figure 34:
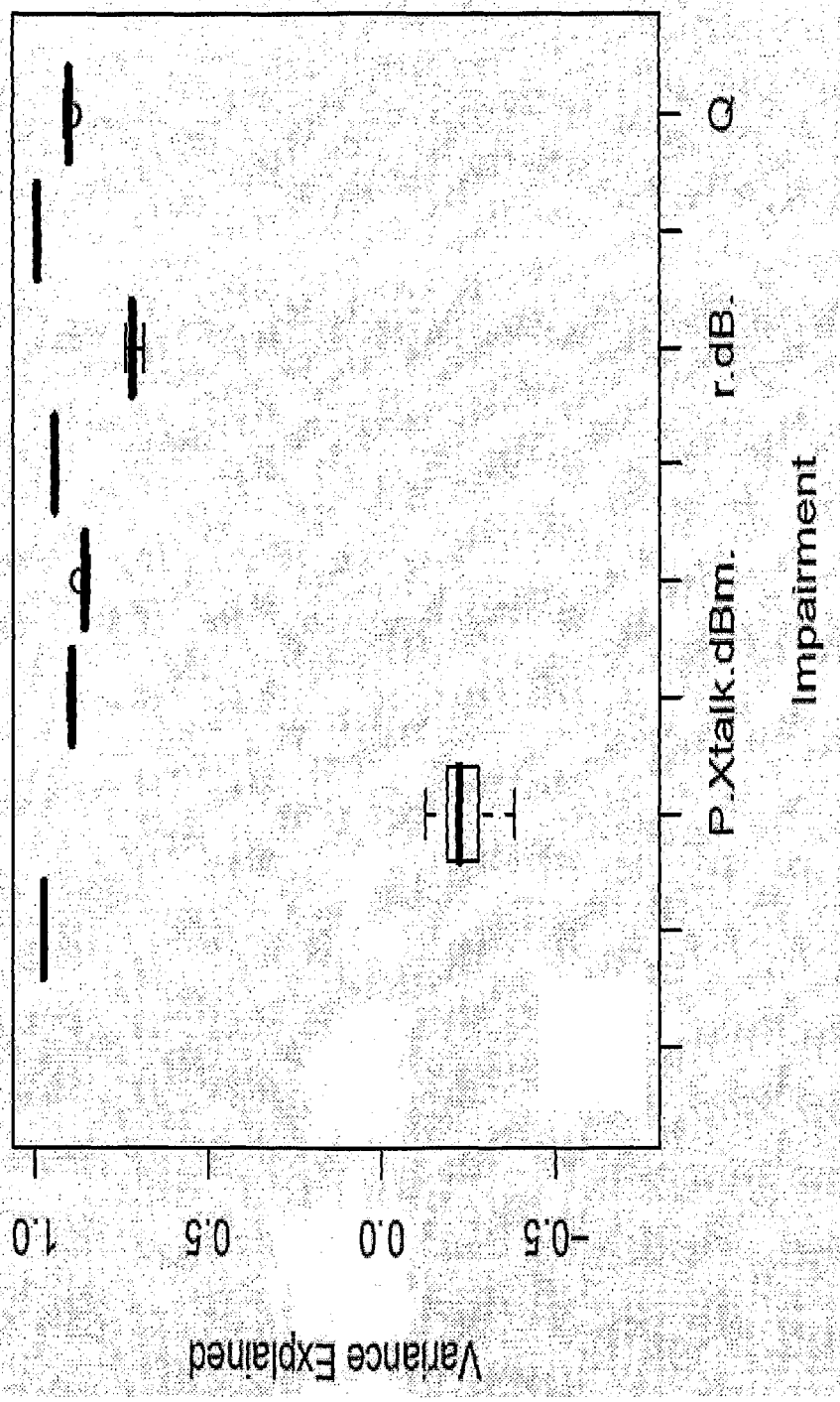
FIG. 34 illustrates the prediction accuracy of a non-linear kernel with polynomial kernel of degree 3 using the outputs of five sample taps at delays 1, ½, ¼, and ⅛ bit periods relative to the leading tap, respectively.

Next a non linear kernel being a polynomial kernel of degree 3 was applied to the obtained samples, with results shown in FIG. 34. From left to right Variance Explained values are provided for OSNR (dB), dispersion (ps/nm), optical power (dBm), crosstalk (dBm), PMD (ps), Df (GHz), r (dB), jitter period and Q. Prediction accuracy can be seen to be relatively high for dispersion (ps/nm), crosstalk (dBm), PMD (ps), Df (GHz), Jitter period and Q, and somewhat accurate for r (dB). Prediction accuracy is poor for OSNR and optical power when using such a non-linear kernel with 5 taps.

It is noted that it may be advantageous to distribute asynchronous monitors according to the present invention along an optical link. The output from the monitors, preferably in the form of multidimensional histograms, may then be passed via a management channel to a central processing point where information from all monitors is input into a pattern recognition module. It is preferable that one of the monitors is placed adjacent to the transmitter.

Figure 35:
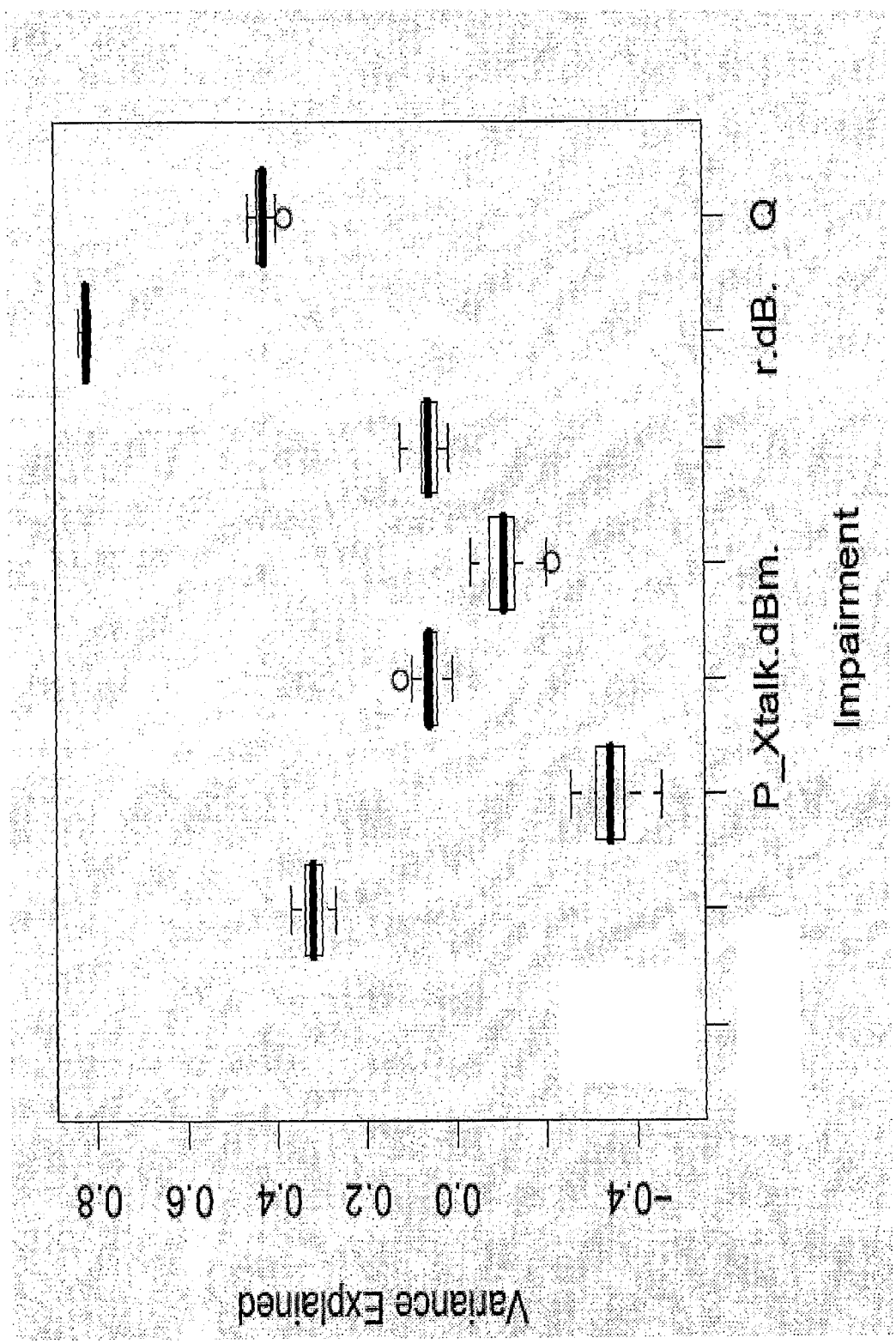
FIG. 35 illustrates the prediction accuracy of the linear kernel using a synchronous eye diagram as an input.

The present invention further recognises that kernel based machine learning techniques may be used to identify and quantify multiple simultaneous impairments from synchronous eye diagrams. FIG. 35 illustrates the prediction accuracy of a linear kernel using a synchronous eye diagram as an input, by plotting Variance Explained for each impairment. From left to right Variance Explained values are provided for OSNR (dB), dispersion (ps/nm), optical power (dBm), crosstalk (dBm), PMD (ps), Df (GHz), r (dB), and Q. Prediction accuracy can be seen to be relatively high for r (dB), but poor for other impairments when using a linear kernel to predict impairments from a synchronous eye diagram.

Figure 36:
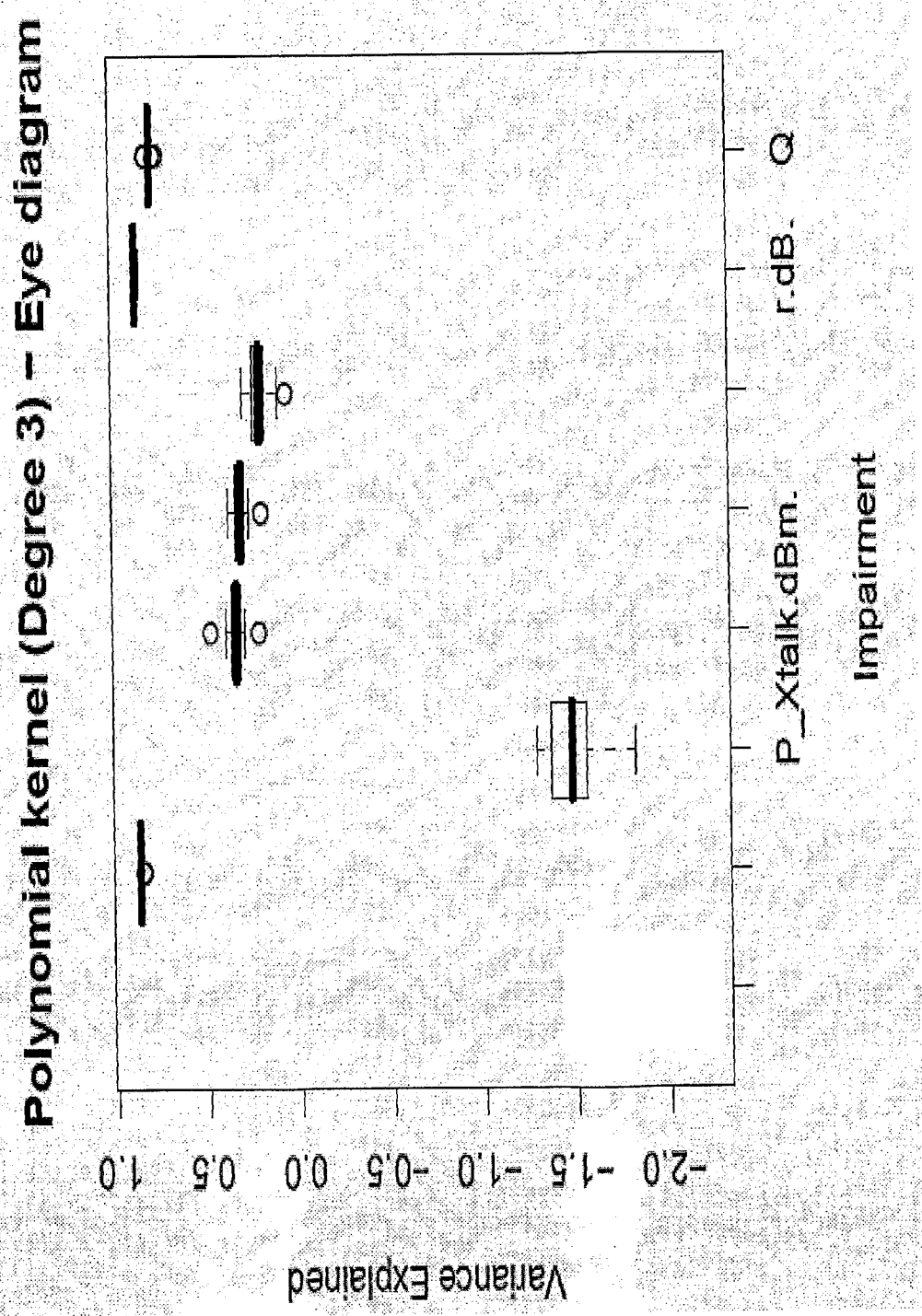
FIG. 36 illustrates the prediction accuracy of a non-linear kernel being a polynomial kernel of degree 3, using a synchronous eye diagram as an input.

FIG. 36 illustrates the prediction accuracy of a non-linear kernel being a polynomial kernel of degree 3, using a synchronous eye diagram as an input, by plotting Variance Explained for each impairment. From left to right Variance Explained values are provided for OSNR (dB), dispersion (ps/nm), optical power (dBm), crosstalk (dBm), PMD (ps), Df (GHz), r (dB), and Q. Prediction accuracy can be seen to be relatively high for r (dB), and relative to FIG. 35 the prediction accuracy for dispersion and Q has improved. However prediction accuracy remains poor for other impairments when using a non linear kernel to predict impairments from a synchronous eye diagram.

It is noted that the 'multi tap synchronous eye diagram' of FIG. 27 may be used as an input to a machine learning algorithm for impairment prediction.

Figure 37B:
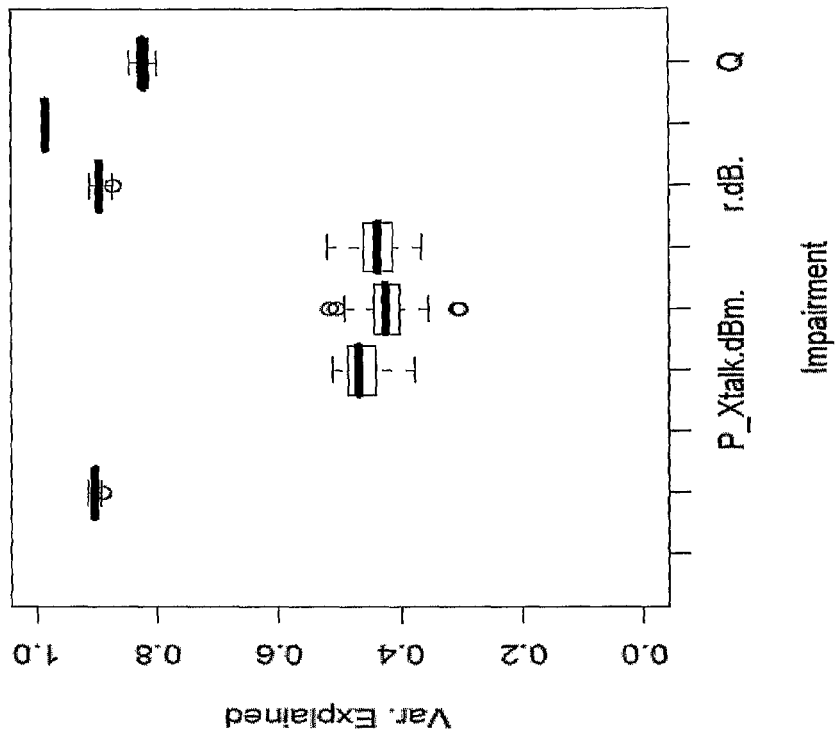
FIGS. 37A and 37B illustrate prediction accuracy for the linear kernel and for a non-linear kernel, respectively, when taking an eye diagram as an input to the machine learning algorithm.
Figure 37A:
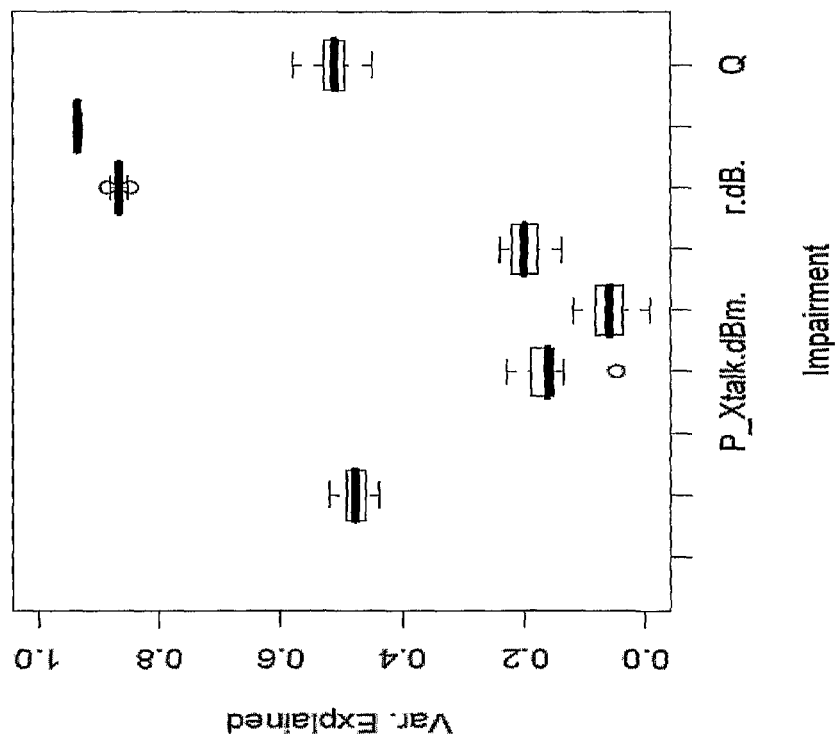

FIG. 37 illustrates prediction accuracy for the linear kernel (FIG. 37A) and for a non-linear kernel (FIG. 37B) when taking an eye diagram as an input to the machine learning algorithm.

Figure 38B:
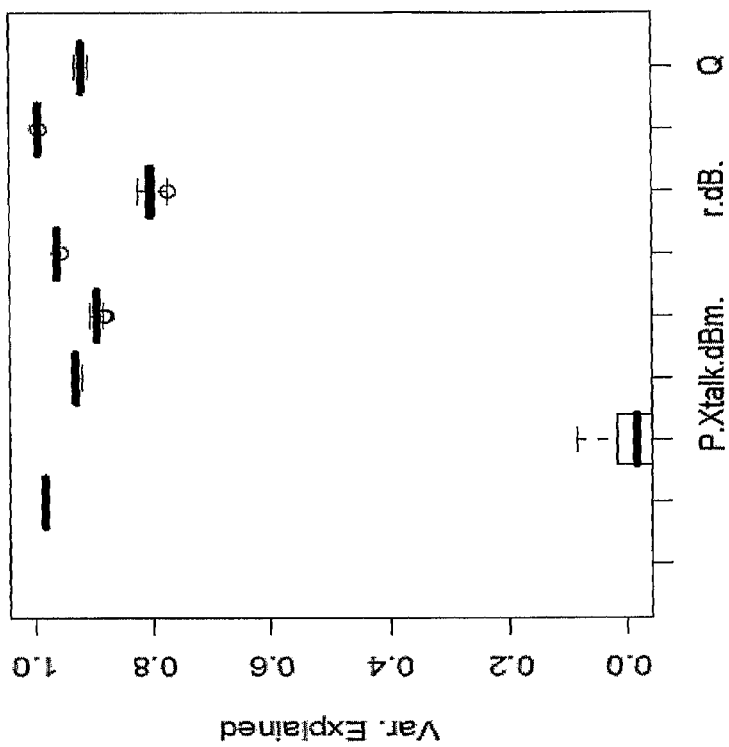
FIGS. 38A and 38B illustrate prediction accuracy for the linear kernel and for a non-linear kernel, respectively, when taking five tap sample sets as an input to the machine learning algorithm.
Figure 38A:
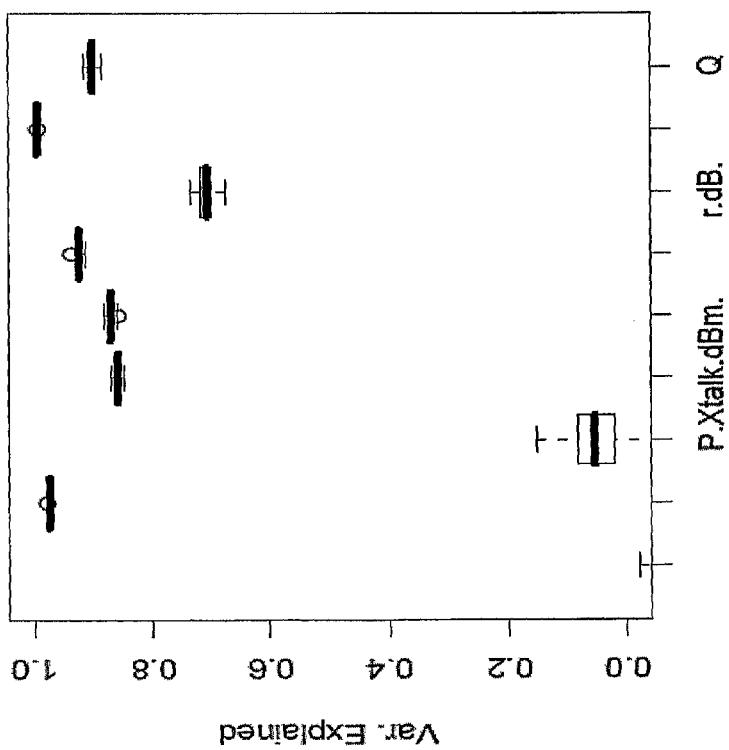

FIG. 38 illustrates prediction accuracy for the linear kernel (FIG. 38A) and for a non-linear kernel (FIG. 38B) when taking five tap sample sets as an input to the machine learning algorithm. The tap delays, relative to the first sample tap, were ⅛, ¼, ½ and 1 bit.

Figure 39B:
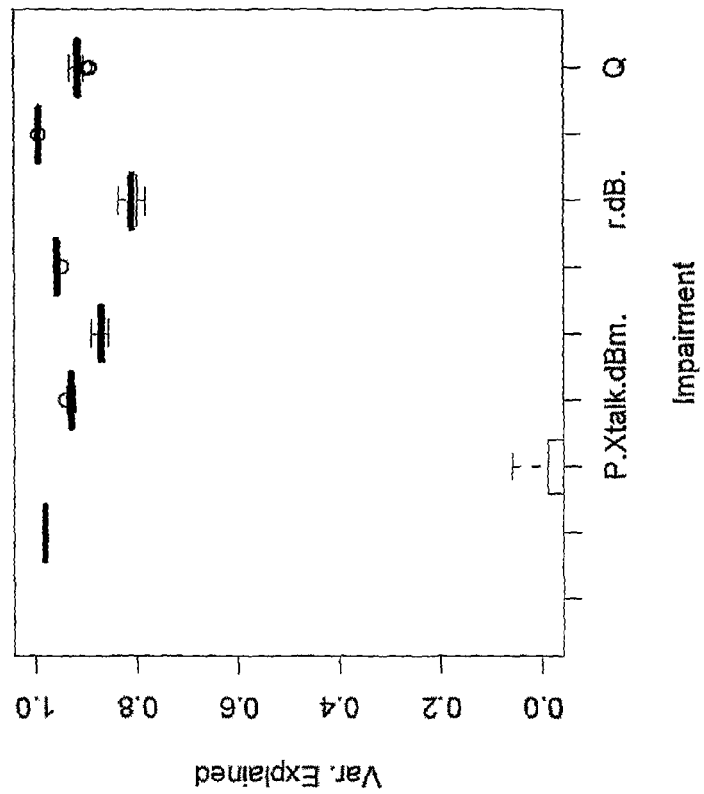
FIGS. 39A and 39B illustrate prediction accuracy for the linear kernel and for a non-linear kernel, respectively, when taking two tap sample sets as an input to the machine learning algorithm.
Figure 39A:
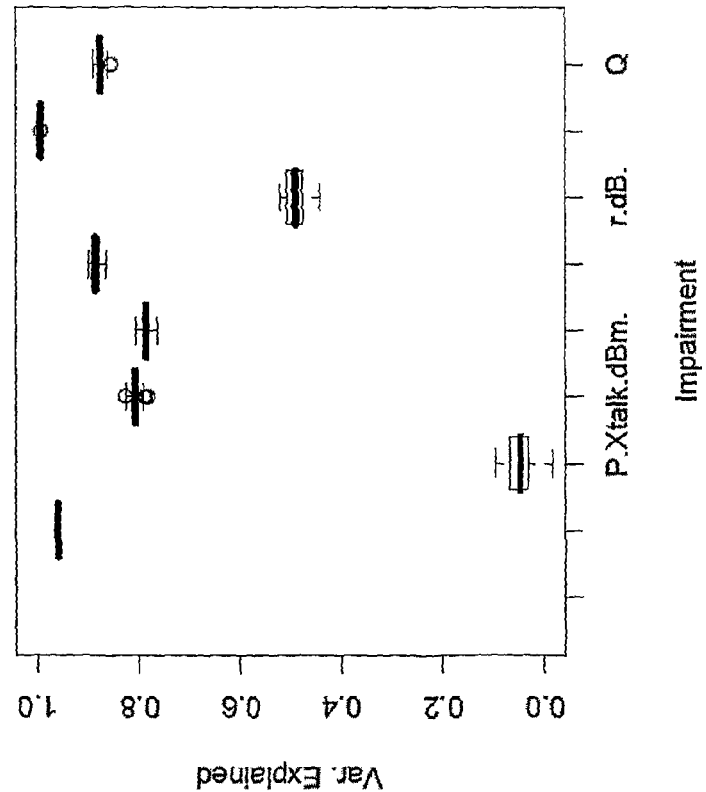

FIG. 39 illustrates prediction accuracy for the linear kernel (FIG. 39A) and for a non-linear kernel (FIG. 39B) when taking two tap sample sets as an input to the machine learning algorithm, with tap delay of 1 bit period.

FIGS. 37 to 39 show the performance on each impairment. For FIGS. 37B, 38B and 39B, the polynomial kernel used was of degree 3. Each plot of FIGS. 37 to 39 has been restricted to show Variance Explained between 0 and 1 only, so boxes not visible show that impairment is being predicted poorly. The impairments are, from left to right: OSNR (Optical Signal to Noise Ratio), D (Dispersion), Popt (Optical Power), P_Xtalk (Crosstalk), PMD (Polarisation mode dispersion), Df (Digital filter frequency), r (Extinction rate), Jitter, and Q. For FIGS. 37 to 39, each impairment was tested using a 2000/1000 test/train split, with 50 permutations (compared with 25 permutations used in generating the results of FIGS. 31 to 36). For each impairment, the box and whisker diagrams indicate the median, 1st, and 3rd quartile. The dark line indicates the median of the 50 runs (permutations), the lower end of the box indicates the 1st quartile (25%), and the upper end of the box indicates the 3rd quartile (75%). Thus 50% of the runs lie within the box. The whiskers extend from the boxes to 1.5 times the inter-quartile distance. The circles are extreme values that lie outside the whiskers.

Some observations can be made from FIGS. 37 to 39. Firstly, switching from a linear kernel to a polynomial kernel results in an increase in performance. This is especially true in the case of the eye diagram, for which prediction accuracy improves considerably for D, P_XTalk, PMD, Df, and Q. A further observation is that there is a performance increase between the multitap and two tap cases. While this is true for both the linear and polynomial kernel, it is especially noticeable when using the linear kernel. Additionally, comparing the synchronous eye diagram to the asynchronous diagrams shows that the asynchronous method performs better using either kernel. This shows that for the models used it is easier to predict the impairments from the asynchronous data.

FIG. 49 illustrates the efficacy of impairment prediction utilising the machine learning algorithms discussed in the preceding with reference to FIGS. 29-39. FIG. 49a illustrates a portion of an NRZ signal trace for a signal having simultaneous impairments at levels shown at top left of FIG. 49, and repeated in Table 2 below. FIG. 49b illustrates the phase portrait, and FIG. 49c illustrates the eye diagram, for the signal of FIG. 49a.

TABLE 2

|  | Actual | Machine Prediction |
| --- | --- | --- |
| Dispersion (ps/nm) | 1132.43 | 1255.09 |
| OSNR (dB) | 23.96 | 24.02 |
| Filter Offset (GHz) | 4.38 | 5.68 |
| PMD (ps) | 35.32 | 34.19 |
| Jitter (%) | 6.6 | 6.15 |
| Q (from error rate) | 7.18 | 7.22 |

As can be seen from Table 2, the machine predictions obtained from the phase portrait of FIG. 49b provide quite good accuracy compared to the actual impairment values. Further, by simulating many such signals with varying levels of impairments and determining prediction accuracy for each such sample from a phase portrait of the type shown in FIG. 49B, the regression plots of FIG. 49d are produced, illustrating that machine prediction is very accurate for OSNR, Jitter and Q, and has promising levels of accuracy for dispersion, filter offset and first order PMD. FIG. 49e provides a further illustration of the prediction accuracy for ten such sample signals with distinct impairment levels.

FIG. 50 illustrates the efficacy of impairment prediction utilising the machine learning algorithms discussed in the preceding with reference to FIGS. 29-39 and 49. FIG. 50a illustrates a portion of an NRZ signal waveform for a signal having the impairment levels at top left of FIG. 50, and repeated in Table 3 below. FIG. 50b illustrates the phase portrait, and FIG. 50c illustrates the eye diagram, for the signal of FIG. 50a.

TABLE 3

|  | Actual | Machine Prediction |
| --- | --- | --- |
| Dispersion (ps/nm) | 1564.61 | 1324.07 |
| OSNR (dB) | 8.33 | 8.09 |
| Filter Offset (GHz) | 3.25 | 9.16 |
| PMD (ps) | 49.67 | 43.82 |
| Jitter (%) | 39.4 | 40.44 |
| Q (from error rate) | 1.23 | 1.31 |

As can be seen from Table 3, the machine predictions obtained from the phase portrait of FIG. 50b provide reasonable accuracy compared to the actual impairment values. The results of FIG. 50d were obtained by simulating many such signals with varying levels of impairments, notably with severe OSNR in the range of 8 to 11 dB for every such signal. The effect of such severe OSNR impairment is evident from the phase portrait of FIG. 50b and the eye diagram of FIG. 50c. Prediction accuracy was determined for each such sample from a phase portrait of the type shown in FIG. 50B to produce the regression plots of FIG. 50d, illustrating that even in the presence of such severe OSNR degradation, machine prediction is very accurate for OSNR, Jitter and Q, and has promising levels of accuracy for dispersion, filter offset and first order PMD. FIG. 50e provides a further illustration of the prediction accuracy for ten such sample signals with distinct impairment levels.

It will be appreciated by persons skilled in the art that numerous variations and/or modifications may be made to the invention as shown in the specific embodiments without departing from the spirit or scope of the invention as broadly described. For example, the impairment monitoring technique may be applied to other types of impairments not discussed in the preceding description, such as alignment accuracy between pulse carver and data modulator in a RZ-OOK system. Further, it is to be appreciated that discussion of the present invention with reference to bit rate or data rate in the present specification may equally apply to symbol rate, CDMA chip rate, or other modulation-related rate, depending upon the modulation scheme employed in the optical signal being monitored, within the scope of the present invention. The present embodiments are, therefore, to be considered in all respects as illustrative and not restrictive.

The invention claimed is:

1. A method of monitoring an optical signal, the method comprising:
   repetitively sampling the optical signal from at least two tap points to retrieve a single successive sample set at each sampling, the at least two tap points being separated by a fixed time delay, the sampling being asynchronous relative to the optical signal, each sample set having a single distinct value of the sampled optical signal from each and every tap point;
   retrieving a plurality of sample sets over time that define a probability density;
   generating a probability distribution directly from the plurality of sample sets, the plurality of sample sets representing a phase portrait of the optical signal; and
   assessing signal quality of the optical signal from the probability distribution.

2. The method of claim 1 further comprising applying supervised machine learning to the step of assessing the signal quality.

3. The method of claim 2 wherein the supervised machine learning involves assessment of sample density.

4. The method of claim 1 wherein the at least two tap points are adapted to retrieve samples from the optical signal which are separated in time by a tap delay.

5. The method of claim 4 further comprising tuning the or each tap delay in order to determine an unknown bit rate of the optical signal being monitored.

6. The method of claim 1 further comprising approximating a synchronous eye diagram from the inverse of the density of the signal value along transition paths in the distribution.

7. The method of claim 1, further comprising determining a modulation scheme of the optical signal by reference to a characteristic shape formed by the distribution.

8. The method of claim 1, further comprising plotting the sample sets, having N samples, as an N-dimensional phase portrait and visually inspecting it to assess signal quality of the optical signal.

9. An optical signal monitor comprising:
   a multi-tap sampler for repetitively sampling the optical signal from at least two tap points adapted to retrieve a single successive sample set at each sampling, the at least two tap points being separated by a fixed time delay, the sampling being asynchronous relative to the optical signal, each sample being a single distinct value of the sampled optical signal from each and every tap point, and retrieving a plurality of such sample sets over time; and
   a processor for generating a probability distribution directly from the plurality of sample sets, the plurality of sample sets representing a phase portrait of the optical signal, and assessing signal quality of the optical signal from the probability distribution.

10. An optical communications link incorporating an optical signal monitor in accordance with claim 9.

11. A method of monitoring an optical communications link, the method comprising:
    distributing along the optical communications link a plurality of optical signal monitors in accordance with claim 9.

* * * * *